(12) United States Patent
Weald et al.

(10) Patent No.: US 10,380,239 B2
(45) Date of Patent: Aug. 13, 2019

(54) DYNAMIC NATIVE ADVERTISMENT INSERTION

(71) Applicant: Sharethrough Inc., San Francisco, CA (US)

(72) Inventors: Ryan Weald, San Francisco, CA (US); Michael Jensen, San Francisco, CA (US)

(73) Assignee: Sharethrough Inc., San Francisco, CA (US)

( * ) Notice: Subject to any disclaimer, the term of this patent is extended or adjusted under 35 U.S.C. 154(b) by 10 days.

(21) Appl. No.: 14/095,163

(22) Filed: Dec. 3, 2013

(65) Prior Publication Data

US 2015/0154660 A1 Jun. 4, 2015

(51) Int. Cl.
*G06F 17/22* (2006.01)
*G06F 17/24* (2006.01)
(Continued)

(52) U.S. Cl.
CPC ........ *G06F 17/248* (2013.01); *G06F 17/2247* (2013.01); *G06Q 30/0277* (2013.01); *H04L 67/42* (2013.01)

(58) Field of Classification Search
CPC .... G06F 17/30011; G06F 3/0482; G06F 8/36; G06F 16/958; G06F 17/248;
(Continued)

(56) References Cited

U.S. PATENT DOCUMENTS 6,698,020 B1 2/2004 Zigmond et al.
6,763,379 B1 7/2004 Shuster
(Continued)

FOREIGN PATENT DOCUMENTS

| WO | WO 01/63444 A2 | 8/2001 | |
| WO | WO-0163444 A2 * | 8/2001 | ............. G06Q 30/02 |
| WO | WO 0163444 A2 * | 8/2001 | ............. G06Q 30/02 |

OTHER PUBLICATIONS

World Intellectual Property Organization, Application No. PCT/US14/56399, International Search Report dated Dec. 30, 2014.
(Continued)

*Primary Examiner* — Chrystina E Zelaskiewicz
*Assistant Examiner* — Chinyere Mpamugo
(74) *Attorney, Agent, or Firm* — Wong & Rees LLP; Karl T. Rees

(57) ABSTRACT

Approaches, techniques, and mechanisms are disclosed for automatically inserting supplemental items into documents. According to an embodiment, a first request is received, comprising document information that identifies a particular document. A target repeated structure type, to which a group of items in the particular document conform, is identified within the particular document. Based on the target repeated structure type, a template is generated. A new content item is generated by applying descriptive metadata that describes the new content item to the template. The new content item conforms to the target repeated structure type. The new content item is inserted in the particular document at an insertion point before or after a particular content item that conforms to the target repeated structure type.

30 Claims, 9 Drawing Sheets

(51) Int. Cl.
*G06Q 30/02* (2012.01)
*H04L 29/06* (2006.01)

(58) Field of Classification Search
CPC . G06F 16/9577; G06F 17/2247; G06Q 10/10; G06Q 30/02; G06Q 50/01; G06Q 30/0261; G06Q 10/06; G06C 30/02; G06C 50/01; G06C 30/0261; H04L 67/02
See application file for complete search history.

(56) References Cited

U.S. PATENT DOCUMENTS

| | | | |
|---|---|---|---|
| 7,099,837 B1 | 8/2006 | Weibel et al. | |
| 7,685,191 B1 | 3/2010 | Zwicky et al. | |
| 8,060,604 B1 | 11/2011 | Breau et al. | |
| 8,266,202 B1 | 9/2012 | Colton et al. | |
| 9,912,767 B1 | 3/2018 | Weald et al. | |
| 2002/0165955 A1 | 11/2002 | Johnson et al. | |
| 2004/0015783 A1* | 1/2004 | Lennon | G06F 16/258 715/235 |
| 2004/0117739 A1* | 6/2004 | Challenger | G06F 16/84 715/251 |
| 2005/0188323 A1* | 8/2005 | Shibata | G06F 17/248 715/760 |
| 2006/0019618 A1* | 1/2006 | Seppala | H04H 60/72 455/121 |
| 2007/0206221 A1* | 9/2007 | Wyler | G06F 16/9577 358/1.15 |
| 2007/0299870 A1 | 12/2007 | Finch | |
| 2008/0018935 A1* | 1/2008 | Gauthier | G06F 17/211 358/1.18 |
| 2009/0024719 A1* | 1/2009 | Wyler | G06F 16/9577 709/219 |
| 2009/0228802 A1* | 9/2009 | Shan | G06Q 30/02 715/733 |
| 2011/0029393 A1 | 2/2011 | Apprendi et al. | |
| 2011/0107241 A1 | 5/2011 | Moore | |
| 2011/0125587 A1* | 5/2011 | Netzer | G06Q 30/02 705/14.68 |
| 2011/0161362 A1 | 6/2011 | Lipscombe et al. | |
| 2011/0231240 A1 | 9/2011 | Schoen et al. | |
| 2012/0166520 A1 | 6/2012 | Lindsay et al. | |
| 2013/0073399 A1 | 3/2013 | Nijamkin | |
| 2013/0073401 A1 | 3/2013 | Cook | |
| 2013/0179794 A1 | 7/2013 | Eastham et al. | |
| 2013/0238449 A1 | 9/2013 | Ferreira et al. | |
| 2014/0100944 A1 | 4/2014 | Zhu et al. | |
| 2014/0136693 A1 | 5/2014 | Greifeneder et al. | |
| 2016/0019243 A1* | 1/2016 | Kamel | G06Q 30/0241 707/737 |
| 2016/0283460 A1 | 9/2016 | Weald et al. | |

OTHER PUBLICATIONS

World Intellectual Property Organization, Application No. PCT/US14/56399, Pending Claims as of Dec. 30, 2014.
Chakrabarti et al. ,"Page-Level Template Detection via Isotonic Smoothing", 16th International World Wide Web Conference, WWW2007—Banff, Alberta, Canada, Jan. 1, 2007.
European Patent Office, Application No. 14868212.3, Extended European Search Report dated Oct. 27, 2016.
European Patent Office, Application No. 14868212.3, Foreign Office Action dated Aug. 4, 2017.
European Patent Office, Application No. 14868212.3, Pending Claims as of Oct. 27, 2016.
European Patent Office, Application No. 14868212.3, Pending Claims as of Aug. 4, 2017.
European Patent Office, Application No. 14868212.3, Summons to Oral Proceedings dated May 23, 2018.
United States Patent and Trademark Office, U.S. Appl. No. 14/144,079, Advisory Action dated Apr. 19, 2016.
United States Patent and Trademark Office, U.S. Appl. No. 14/144,079, Final Office Action dated Jan. 21, 2016.
United States Patent and Trademark Office, U.S. Appl. No. 14/144,079, Non-Final Office Action dated Aug. 14, 2015.
United States Patent and Trademark Office, U.S. Appl. No. 14/144,079, Non-Final Office Action dated Jun. 24, 2016.
United States Patent and Trademark Office, U.S. Appl. No. 14/144,079, Notice of Allowance dated Oct. 19, 2017.
United States Patent and Trademark Office, U.S. Appl. No. 15/912,424, Notice of Allowance dated Dec. 21, 2018.
European Patent Office, Application No. 14868212.3, Decision to Refuse dated Mar. 15, 2019.

* cited by examiner

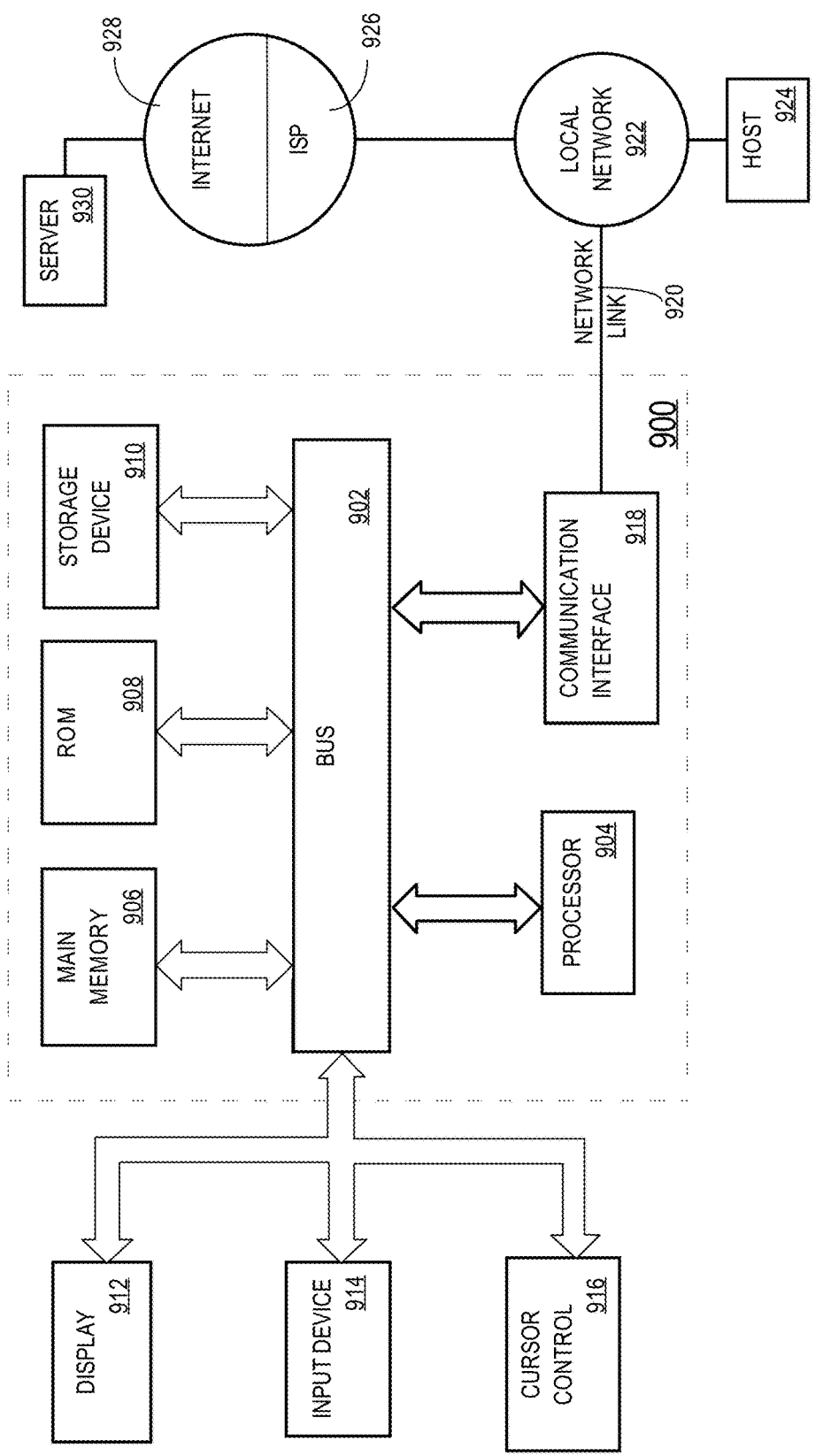

DYNAMIC NATIVE ADVERTISMENT INSERTION

TECHNICAL FIELD

Embodiments relate generally to the insertion of advertisements and/or other supplemental items into content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A supplemental item, as used herein, is a data structure that comprises or causes a presentation of information to be shown in coordination with other media content. The other media content may include, without limitation, web pages, electronic publications, and other types of documents. A user will have typically indicated an express intent to view the other media content, such as by opening a document or clicking on a link. In contrast, the supplemental item is typically not expressly requested by the user. An example of a supplemental item is an advertisement, which is a presentation of information intended to persuade an individual to take a particular course of action. Advertisements are often presented within or otherwise in coordination with media content. Other examples of supplemental items include, without limitation, content recommendations, widgets, user-generated comments, and so forth.

A particular category of advertisements described herein is third-party advertisements. Third-party advertisements are produced by a third-party entity (the "advertiser") that is different from the producer or publisher of the media content. The publisher of the media content will often be compensated by the advertiser, or an aggregator that distributes advertisements on behalf of multiple advertisers, for publishing third-party advertisements along with the publisher's own media content.

Advertisement placement within media content conventionally involves a number of processes. For example, one of these processes is selecting which advertisement to place within which items of media content. Various modern computer algorithms automate this selection process to a degree, based on factors such as the actual content of the media item into which an advertisement is to be placed, current or historical information about an individual to whom the media content is intended to be shown, current or historical information about a client device at which the media content is to be shown, the time of day, and so forth.

Another process involved in advertisement placement is determining where within the media content to show an advertisement. This determination is typically a manual process, made by the publisher when designing the layout of content within a certain media. The publisher will often designate certain sections within or around the media content as being sections in which advertisements may be placed. For greater flexibility in advertisement placement, these sections are typically of pre-defined sizes, dictated by the advertisement industry. A given advertisement may then be re-used by a variety of publishers, thus avoiding the need to create new advertisements for each and every publication in which the advertisement will be shown. For example, in the web publishing industry, it is common for advertisers to distribute their advertisements as image files of pre-defined image sizes, often referred to as "banners."

Unfortunately, conventional advertisement placement techniques make it easy for a user to recognize and ignore advertisements without ever actually considering the content of those advertisements. For example, since web advertisements consistently appear in the same sections of the web site, users often habitually ignore those sections. As another example, since web advertisements are made to appear the same across all web sites, the appearance of a web advertisement will often be quite different from that of original web site content. Users thus often intuitively differentiate between original web site content and an advertisement. Consequently, users often intuitively ignore an advertisement, even if it appears in an unusual position. For these and other reasons, conventional advertisement placement techniques are increasingly ineffective.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9 is block diagram of a computer system upon which embodiments of the invention may be implemented.

DETAILED DESCRIPTION

Figure 1:
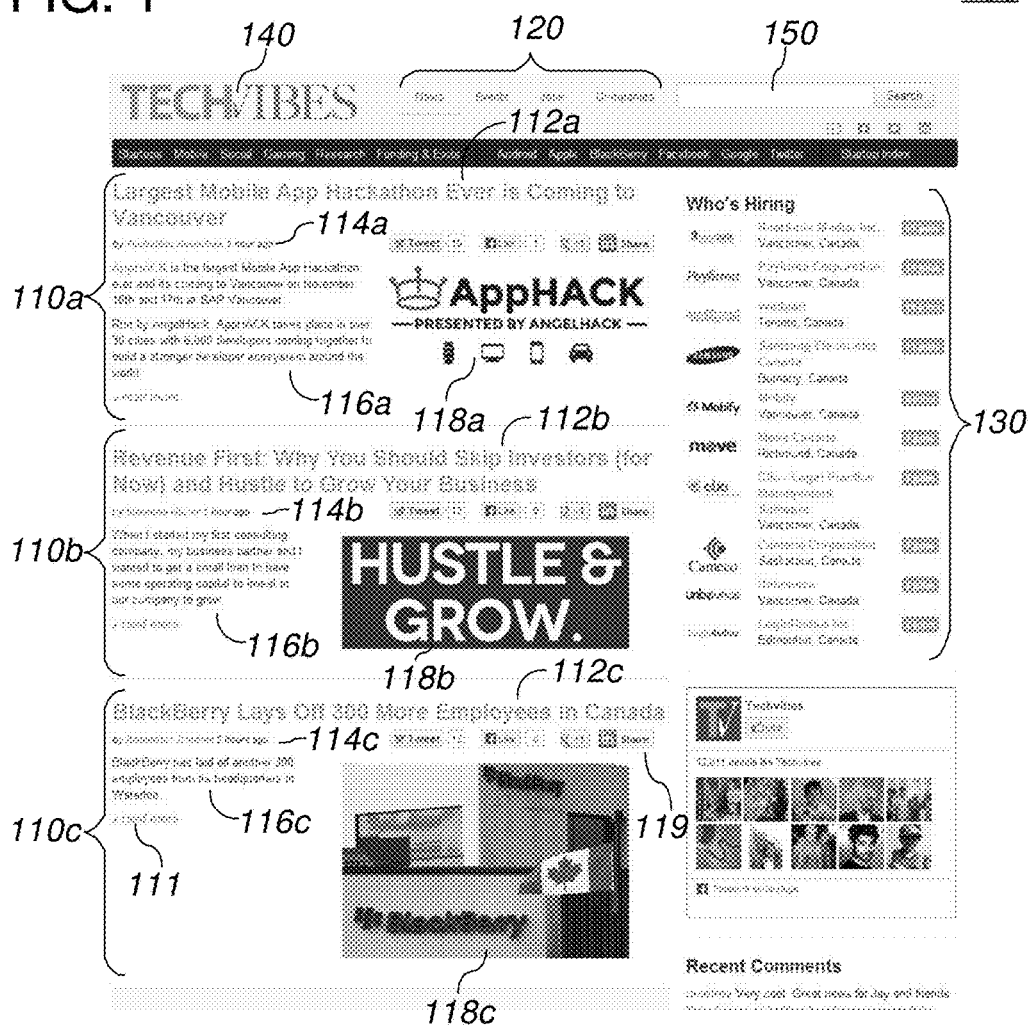
FIG. 1 illustrates an example document into which a supplemental item, such as an advertisement, may be placed.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
      1.1. Native Supplemental Content
   2.0. Functional Overview
      2.1. Insertion of Supplemental Content
      2.2. Repeating Structure types
      2.3. Identifying a Target Repeating Structure Type
      2.4. Generating a Supplemental Item Template
      2.5. Identifying an Insertion Point
      2.6. Achieving Native Appearance 3.0. Structural Overview
   3.1. General System
   3.2. System with Client-Based Insertion
   3.3. System with Server-Based Insertion
4.0. Implementation Examples
   4.1. Template Verification Data
   4.2. Example Supplemental Item Description
   4.3. Example Rendered Supplemental Item
   4.4. Example JavaScript-Based Insertion Flow
   4.5. Variations
5.0. Implementation Mechanism—Hardware Overview
6.0. Extensions and Alternatives 1.0. General Overview Approaches, techniques, and mechanisms are disclosed for automatically inserting supplemental items into documents. According to an embodiment, a first request is received, comprising document information that identifies a particular document. A target repeated structure type, to which a group of content items in the particular document conform, is identified within the particular document. Based on the target repeated structure type, a template is generated. A new content item is generated by applying descriptive metadata that describes the new content item to the template. The new content item conforms to the target repeated structure type. The new content item is inserted in the particular document at an insertion point before or after a particular content item that conforms to the target repeated structure type.

According to an embodiment, a first request is received, comprising content information that identifies particular content. Based on the content information, a template is selected. A new content item is generated by applying descriptive metadata that describes the new content item to the template. The new content item conforms to the target repeated structure type. The new content item is inserted in the particular content at an insertion point before or after a particular content item within a group of content items that conform to the repeated structure type.

In an embodiment, a new content item is selected from a repository of content items submitted by one or more third-party entities. The repository describes each of the content items with metadata values corresponding to defined fields of metadata. The descriptive metadata is retrieved from the repository. The descriptive metadata does not conform to the repeated structure type. In an embodiment, the document/content information in the first request comprises at least one of: a Uniform Resource Identifier (URI) of the particular document/content, or at least a portion of the particular document/content.

In an embodiment, the first request is received at a server, from a client. The server identifies the target repeated structure type and generates the template. The server causes the client to generate the new content item and insert the new content item into the particular document, at least partially by sending the template and the descriptive metadata from the server to the client. In an embodiment, the server further generates insertion instructions that instruct the client to insert the new content item at the insertion point. The server causes the client to generate the new content item and insert the new content item into the particular document at least partially by sending the template, the descriptive metadata, and the insertion instructions from the server to the client.

In an embodiment, the first request is received at a server, from a client. The server identifies the target repeated structure type and generates the template. The server stores the template in a cache. The server receives, from a second client, a second request comprising the document information that identifies the particular document. The server causes generation of the new content item, based on the template in the cache, responsive to the second request. The server further causes the second client to insert the new content item into the particular document. In an embodiment, the server further generates verification data that at least identifies the target repeated structure type. The server stores both the template and the verification data in the cache. The server sends the verification data to the second client. The server instructs the second client to insert the new content item, based on the template in the cache, into the particular document responsive to the second client verifying, based on the verification data, that the particular document still comprises a group of content items that conform to the target repeated structure type.

In an embodiment, the particular document is a web page. The web page includes instructions that cause a client to send the first request to a server. The server responds to the first request at least with ad insertion data configured to cause the client to insert the new supplemental item into the web page.

In an embodiment, a client as described above and in various other passages of the disclosure, is one of a client computing device operated by a user that has requested to view the document, or a website from which the particular document is provided.

In an embodiment, the insertion point is between the particular content item and a second content item that conforms to the target repeated structure type. In an embodiment, a plurality of different repeated structure types are identified within the particular document. Groups of content items within the particular document conform different structure types of the plurality of different repeated structure types. Identifying the target repeated structure type comprises selecting the target repeated structure type from the plurality of different repeated structure types. In an embodiment, based on a plurality of different documents and historical data indicating human feedback concerning the plurality of different documents, a pattern recognition component is trained to recognize repeated structure types, within the plurality of different documents, that have been selected by one or more humans. Identifying the target repeated structure type comprises selecting the target repeated structure type from the plurality of different repeated structure types using the pattern recognition component.

In an embodiment, the target repeated structure type is a construct comprising one or more of: at least one element type, or at least one element attribute.

In an embodiment, generating the template comprises: identifying sub-structure types to which sub-items of content items, in the group of content items, conform; identifying which of the sub-structure types are repeated sub-structure types that are used in multiple content items within the group of content items; mapping the repeated sub-structure types to fields of metadata within a repository of supplemental item metadata; generating one or more template elements that correspond to the target repeated structure type; generating, within the one or more template elements, one or more template sub-elements that correspond to the mapped repeated sub-structure types; and inserting identifiers representing the mapped fields of metadata into template sub-elements to which the mapped fields of metadata are mapped.

In an embodiment, the insertion point is selected based on one or more of: client identification information associated with the first request, user identification information associated with the first request, or one or more keywords identified within the group of content items.

According to an embodiment, a system for practicing techniques described herein comprises: a distribution component, configured to distribute item insertion initiating instructions to clients at which documents will be displayed, the item insertion initiating instructions configured to cause the clients to send requests to a server to insert supplemental items into the documents; a template cache configured to store, in one or more memories, supplemental item templates; a template loader component, at the server, configured to select particular supplemental item templates from the template cache based on document identifying information associated with the requests; a repository of supplemental items configured to store supplemental item descriptive metadata for each of the supplemental items; an item selector component, at the server, that selects, from the repository of supplemental items, particular supplemental items to insert in the documents based on the requests; one or more supplemental item renderers configured to generate rendered supplemental items based on particular supplemental item templates selected by the template loader component and particular supplemental items selected by the item selector component; and one or more item insertion components that insert the rendered supplemental items into the documents.

In an embodiment, the system further comprises a template generation component that generates the supplemental item templates based on repeated structure types identified within the documents.

In other aspects, the invention encompasses a computer apparatus and a computer-readable medium configured to carry out the foregoing steps.

For convenience, this disclosure describes several examples in which the supplemental items are advertisements. However, the techniques described herein are equally applicable to the insertion of other types of supplemental items into documents and other content.

1.1. Native Supplemental Content

FIG. 1 illustrates an example document 100 into which a supplemental item, such as an advertisement, may be placed, according to an embodiment. Example document 100 includes, among other components, content items of non-repeating structural types, such as a title 140 and search box 150, and content items of repeating structural types, such as navigation links 120, listings 130 and news feed articles 110. Document 100 is an example of an increasingly prevalent type of document known as a "feed," in which the main content of the document is a set of multiple similar content items that are grouped together in an arrangement, such as a list. Feeds appear in a variety of contexts, such as news aggregation, social media, shopping applications, forums, and so forth.

Content items 110-150 may comprise their own sub-elements of varying structure types. For example, news feed articles 110 each comprise sub-elements that correspond to different sub-structure types, including article title 112, article publishing information 114, article content 116, and article image 118. For instance, if example document 100 were a web page written in Hyper-Text Markup Language ("HTML"), each content item 110a-110c might be of a <div> element type with a "class='article'" attribute (collectively denoted herein as a "div.article" structure type). Similarly, each sub-element 112 might be of an "h3" structure type, each sub-element 114 might be of a "span.author" structure type, each sub-element 116 might be of a "div.content" structure type, and each sub-element 118 might be of an "div.thumbnail" structure type. Of course, these data structure types are given only as an example, and document 100 is not limited to any particular set of underlying data structure types. Each news feed article 110 may further comprise sub-elements such as an article footer 111 and sharing controls 119.

Figure 2:
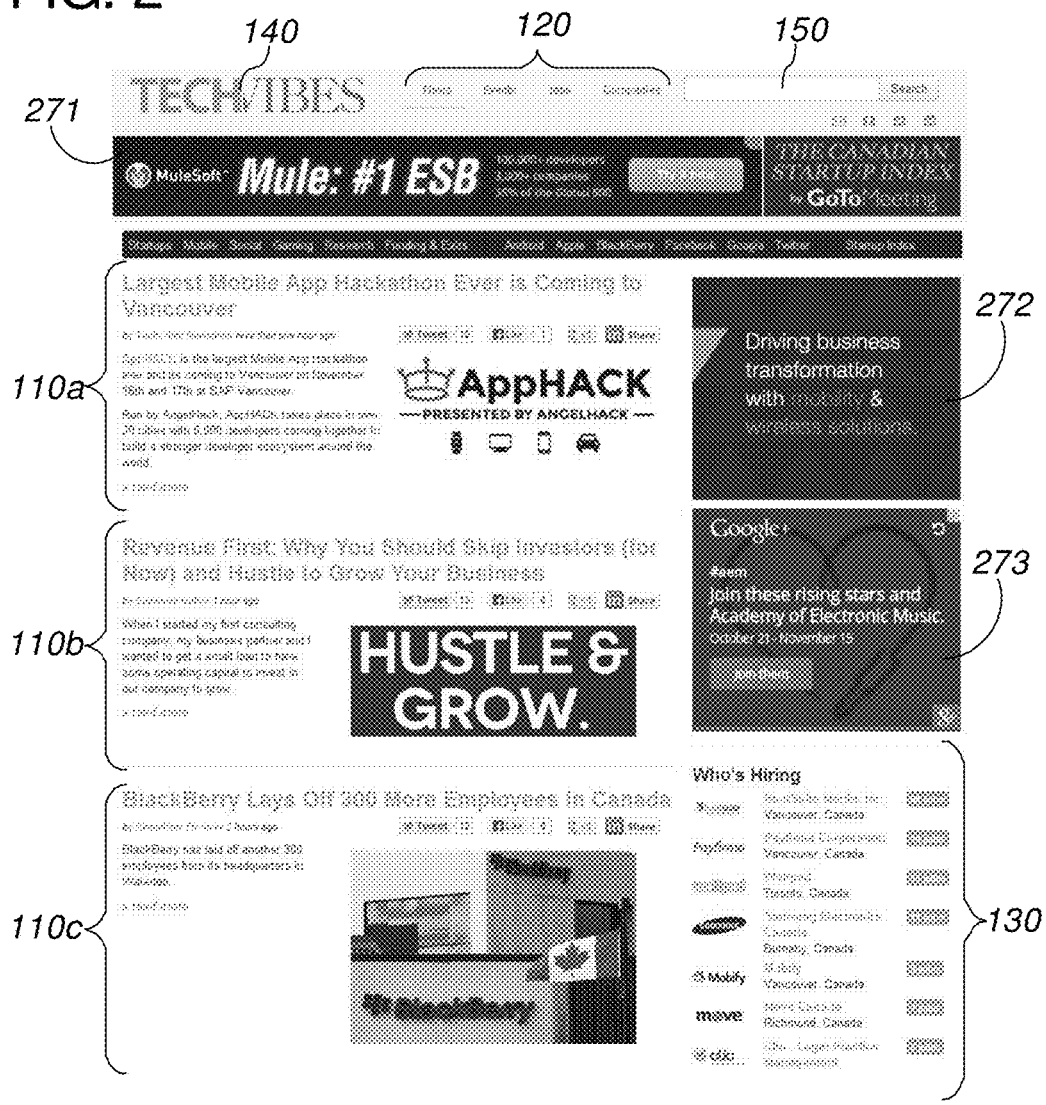
FIG. 2 illustrates an example document in which supplemental items have been placed using conventional advertisement techniques.

FIG. 2 illustrates an example document 200 in which supplemental items have been placed using conventional advertisement techniques. Example document 200 comprises the same components 110-150 as example document 100 above. Additionally, certain pre-defined sections of document 200 have been reserved for supplemental items, including advertisements 271-273. Advertisements 271-273 are images of pre-defined size, and quite easily differentiated from components 110-150.

Figure 3:
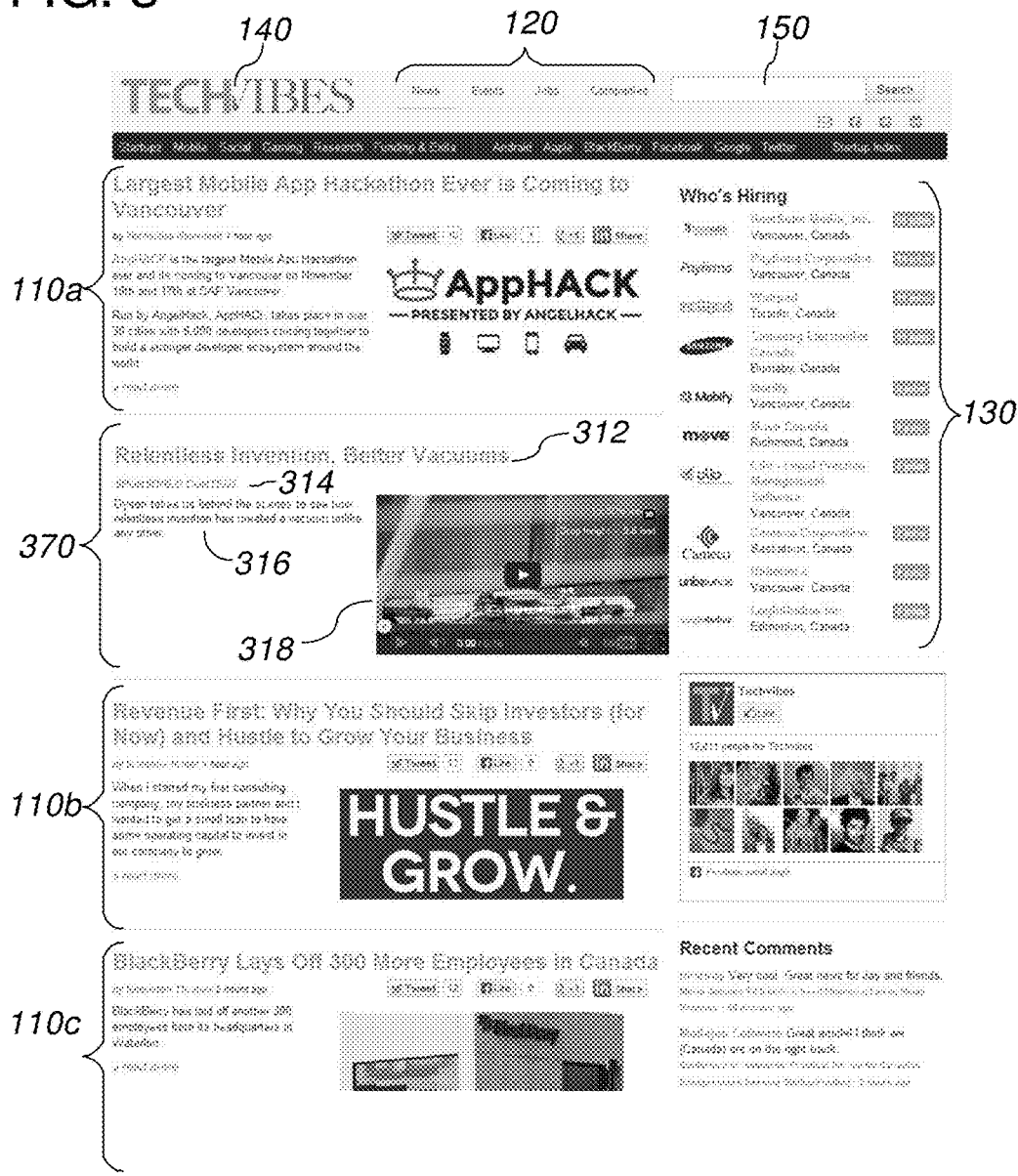
FIG. 3 illustrates an example document in which supplemental items have been placed using a "native" placement technique.

FIG. 3 illustrates an example document 300 in which supplemental items have been placed using a "native" placement technique, according to an embodiment. Example document 300 comprises the same components 110-150 as example document 100 above. Example document 300 further comprises a supplemental item 370. In contrast to supplemental items 271-273 of FIG. 2, supplemental item 370 has been inserted into a group of content items 110 that have a same structure type. More specifically, supplemental item 370 has been inserted between content items 110a and 110b, to appear as a member of the group of content items 110. Consequently, supplemental item 370 is not so easily differentiated from components 110-150 as supplemental items 271-273 of FIG. 2.

Consistent with this appearance, supplemental item 370 is of a structure type that is analogous to that underlying content items 110. Supplemental item 370 further comprises sub-elements that include title 312, sponsorship information 314, content 316, and image 318, which are of analogous sub-structure types to sub-elements 112, 114, 116, and 118, respectively. For instance, referring back to the HTML-based example above, supplemental item 370 might be of the "div.article" structure type, sub-element 312 might be of the "h3" structure type, sub-element 314 might be of the "span.author" structure type, sub-element 316 might be of the "div.content" structure type, and sub-element 318 might be of the "div.thumbnail" structure type.

However, a strict reuse of structure and/or sub-structure types between content items 110 and supplemental item 370 is not necessary, so long as supplemental item 370 is rendered in such a manner that sub-elements 312-318 are arranged and formatted substantially similarly to sub-elements 112-118. For example, in some embodiments, a supplemental item may keep the same arrangement of structure types, but substitute one or more formatting classes and/or attributes so that the supplemental item has a slightly different appearance. For instance, the supplemental item may have a different background, title font, margin, thumbnail size, or any other formatting difference. As another example, a supplemental item may use one or more different structural elements than found in the content items, but nonetheless apply the same formatting classes and/or attributes to those different structural elements as were applied to the structural elements of the content items.

This disclosure describes a number of techniques and mechanisms whereby supplemental items, such as supplemental item 370, may be inserted into content, such as document 100, "natively," such as illustrated by FIG. 3. Example document 100 illustrates but one of many types of documents for which these techniques and mechanisms may be utilized. In other such documents, content items having a same structural type may be organized in different arrangements, such as galleries, lists, slideshows, etc. Native supplemental items may be inserted into these and any other suitable arrangement of content items that have a same structure type. Moreover, while document 100 is a web page, the techniques described herein may be applied to any type of media that comprises a group of content items that have an identifiable common structure type, including feeds shown within standalone applications, such as applications for smartphones or desktop computer.

Moreover, each content item having a repeated structure type need not necessarily be rendered in exactly the same manner. For example, formatting instructions included with a document may dictate that a first set of one or more content items within a group of content items be presented differently than a second set of one or more content items within the same group, even though all content items within the group share the same structure type. This may occur on a website, for instance, where the top several news article are displayed using expanded formatting, whereas the remainder are shown as a gallery or list. In an embodiment, a supplemental item could be inserted into the group and presented using either formatting style, depending on where the supplemental item is inserted.

A document as used herein refers to content provided from a particular location, such as a URL. The content provided from the particular location may, of course, change from time to time, or even from one access request to another access request. However, for purposes of this disclosure, the content provided from the particular location is still considered to be the same document, even after changing.

2.0. Functional Overview

In an embodiment, each of the processes described in this section may be implemented using one or more computer programs, other software elements, and/or digital logic in any combination of general-purpose computing devices or a special-purpose computing devices, while performing data retrieval, transformation, and storage operations that involve interacting with and transforming the physical state of memory of the computing devices(s). In some embodiments, the processes are implemented in a system comprising a client computing device at which the document is viewed, such as a personal computer or mobile device, and one or more servers, such as a web server and/or a third-party advertisement insertion server. A server, as used herein, is a system of one or more computing devices that collectively operate to provide various functionalities described herein. In other embodiments, the processes are implemented exclusively by one or more servers or by a single client computing device. Specific examples of such systems are described in subsequent sections.

2.1. Insertion of Supplemental Content

Figure 4:
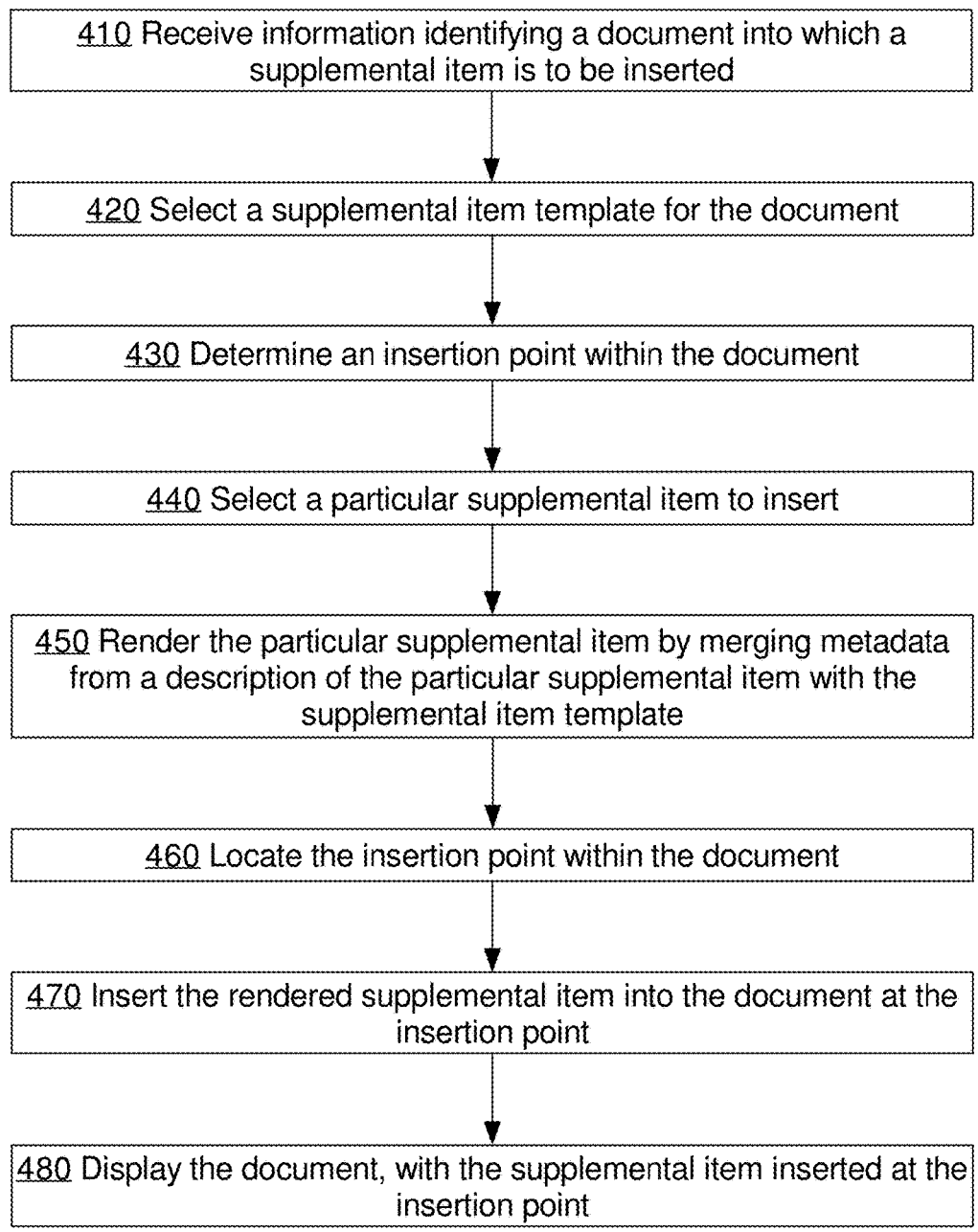
FIG. 4 depicts an example flow for inserting a supplemental item within a document.

FIG. 4 depicts an example flow 400 for inserting a supplemental item within a document, according to an embodiment. Block 410 comprises receiving information identifying a document into which a supplemental item is to be inserted. The information may be received, for example, in a request over a network and/or via a call to an application programming interface. The information may include the document itself and/or refer to the document by one or more identifiers, such as a Uniform Resource Locator ("URL").

Block 420 comprises selecting a supplemental item template for the document. In an embodiment, templates are selected from a plurality of pre-existing templates based on the document or the document identifier. The template may have been specifically associated with one or more URLs or other suitable document identifiers, including that of the document. Or, the template may be selected based on comparing repeated data structures within the document to the pre-built templates, and selecting the closest match. In an embodiment, client characteristics and/or user data may also be considered when selecting a template. For example, different templates may be selected depending on information in the browser user agent string received from the client that will be displaying the document.

In an embodiment, selecting the supplemental item template may involve generating a new template for the document. Template generation may involve retrieving the document (if it was not received in block 410) and analyzing the document for repeating data structure types, as described in other sections.

In an embodiment, selecting the supplemental item template may involve determining whether a pre-existing supplemental item template is found for the document in a template cache. If so, then the pre-existing supplemental item template is selected. Otherwise, a new supplemental item template is generated and selected. The new supplemental item template may be cached for future use. In an embodiment, since template generation may be a relatively time-consuming process, if a valid pre-existing supplemental item template is not found, a default template is selected until a new supplemental item template can be generated. Meanwhile, a new supplemental item template is generated in the background, or scheduled for generation, and then cached for future instantiations of flow 400. In an embodiment, if a valid pre-existing supplemental item template is not found, the current instantiation of flow 400 is aborted, and no supplemental item will be inserted into the document for this current instantiation.

In an embodiment, the document is identified by a URL. The document may change from time-to-time. An external process, outside of flow 400, may periodically or semi-periodically request the document from the URL, and generate a new supplemental item template for the document. The new supplemental item template may then be cached for future use. In an embodiment, this process and/or block 420 in general may further comprise determining whether the document has changed since its supplemental item template was generated. The pre-existing supplemental item template is used only if the document has not changed. In other embodiments, the pre-existing supplemental item template may still be used even if a document has changed, so long as the data structure types found within the document remain the same. Example techniques for making such determinations are found in other sections of this disclosure.

Block 430 comprises determining an insertion point within the document. The insertion point is often between a first content item in a group of content items that have a common structure type and a second content item in the group. The insertion point may instead be at the beginning or end of the group, but still within a container structure for the group. Performance of block 430 assumes that the group of content items, or at least the underlying data structure type of the content items in the group, has already been identified, either as part of block 420, in another function block (not depicted), or at the time a pre-existing template in the cache was generated. Techniques for identifying such a group, and for identifying an insertion point relative to such a group, are described in other sections.

In some embodiments, on account of template caching, the actual group of content items into which the supplemental item should be inserted is not known at the time of determining the insertion point. Consequently, the insertion point may be designated by the location of a target data structure type within the document, such as by a schema element name, DOM node, or other suitable convention. In an embodiment, the insertion point is further designated relative to an enumerated content item of the group of content items into which it is to be inserted. For instance, the insertion point may be designated as "before the fourth content item having structure x," or "after the ninth content item found in the container structure y."

Block 440 comprises selecting a particular supplemental item to insert. In an embodiment, the selection of the particular supplemental item involves selecting from supplemental items described in a data repository. Each of the supplemental items is described with metadata, some or all of which may be utilized in selecting the particular supplemental item. The descriptive metadata may include, for instance, a title, content, thumbnail, video, image, link address, keyword(s), and so forth. Each supplemental item may further be associated with distribution metadata, such as a compensation amount, a number of times the item has been inserted, a click-through rate, a target number of insertions, preferred provider(s) into whose content the supplemental item is to be inserted, and so forth. Considerations involved in selecting the particular supplemental item may include a random number function, an item selection pattern, a comparison of certain descriptive metadata for each supplemental item to current, previous, and/or expected contents of the document, predefined associations between certain supplemental items and the document or a provider of the document, an expected compensation amount relative to the distribution metadata, predicted user behavior based on historical tracking data, and so forth. In an embodiment, the selection involves a ranking process based on any one or more of the above considerations.

Block 450 comprises rendering the particular supplemental item by merging metadata from a description of the particular supplemental item with the supplemental item template. The rendering may involve any of a variety of template-based techniques. For example, the rendering may involve inserting descriptive metadata items for the particular supplemental item into template elements to which the descriptive metadata items have been respectively mapped. As another example, the rendering may involve replacing variables within the supplemental item template with descriptive metadata items to which the variables are mapped.

Block 460 comprises locating the insertion point within the document by any of a variety of mechanisms. For example, if the insertion point is designated by a data structure type and number, the insertion point may be located by searching for content items that conform to the target data structure type until the designated number of content items is found. The searching may involve standard string searching, building a document-object-model ("DOM"), and/or other searching techniques. Or, as another example, if the insertion point is designated using a specific address, the location of the specific address within the document may be found. In an embodiment, block 460 may also or instead involve searching for a pre-defined insertion point within the document, such as indicated by publisher comments in markup code or other suitable means. In an embodiment, block 460 may also or instead involve searching for a particular content item that both conforms to the target data structure type and has certain characteristics, such as certain text or keywords.

Block 470 comprises inserting the rendered supplemental item into the document at the insertion point. Any of a variety of insertion techniques may be utilized, depending on the context. For example, if the insertion is being performed on a web page by a web browser at a client device, the insertion may be accomplished using any of a number of JavaScript functions. As another example, if the insertion is being performed by a web server, most programming languages feature a number of string manipulation and/or DOM manipulation functions that allow insertion of the rendered supplemental item at the designated insertion point. In an embodiment, the insertion involves inserting the supplemental item as a new content item before or after an existing content item, without deleting any content items from the document. In another embodiment, block 470 may comprise deleting an existing content item at the identified insertion point, and replacing it with the supplemental item.

Block 480 comprises displaying the document, with the supplemental item inserted at the insertion point. For example, after having inserted a supplemental item such as supplemental item 370 of FIG. 3 into a document such as document 100 of FIG. 1, a web browser would display the document 300 as depicted in FIG. 3.

Flow 400 is but one example technique for inserting a supplemental item. Other flows may include fewer or additional elements in varying arrangements. Blocks 410-480 need not be started or completed in any particular order, except where they rely on data from another of blocks 410-480. For example, in some embodiments, block 420 and block 440 may be performed at substantially the same time relative to each other, or block 440 may be performed prior to block 420.

In some embodiments, multiple supplemental items may be inserted into a single document. In an embodiment, the multiple supplemental items may be inserted over multiple instantiations of flow 400. Block 420 may or may not be repeated for each of these instantiations. In another embodiment, multiple supplemental items and insertion points may be selected in a single instantiation of flow 400. For example, multiple supplemental items and multiple insertion points may be returned along with a common supplemental item template, in response to a single request from a client to insert items into a web page. In yet another embodiment, a document may comprise multiple groups of content items into which supplemental items are to be inserted, the content items in each group having a different common structure type. Therefore, multiple supplemental item templates are identified in addition to the multiple supplemental items.

2.2. Repeating Structure Types

Various processes described herein involve identifying and/or referencing one or more repeated "structure types" for content items, and their respective sub-elements, within a document. In an embodiment, the structure type of a content item is a document-specified construct to which the content item conforms. The document-specified construct may be a construct specifically defined by a schema, document type definition, or other suitable pre-declared definition. For example, in the context of an HTML document, the structure type may a specific element type (i.e. the "tag name"), such as <div> or <p>. The document-specified construct may also be a classifier, such as a HTML class attribute, or other suitable declared attribute of the HTML elements.

In an embodiment, the structure type may be a combination of one or more pre-declared constructs and one or more attributes. For example, in the context of an HTML document, the structure type might be a combination of the <div> element type with a "class='article'" attribute (denoted herein as a "div.article" structure type). As another example, two or more HTML element types may repeat together in a pattern. These two or more HTML element types collectively constitute a repeating structure type.

In an embodiment, some or even all of the structure types are derived constructs. These constructs are derived from a comparison of characteristics from document content items with characteristics from other document content items. For example, a repeating structure type may be derived from the fact that multiple content items within the document include certain formatting styles, a certain thumbnail image or size of image, and/or certain introductory textual content. In fact, a repeating structure type may be derived from just about any common characteristic(s) shared by multiple content items within a document, so long as the characteristic(s) may be described in such a manner so that content items having the characteristic(s) may subsequently be located during the insertion process.

In an embodiment, a single content item within a document may be considered to conform to multiple construct types. For example, consider the following two HTML elements shown in Table 1.

TABLE 1

EXAMPLE HTML ELEMENTS

<div class="a b c">
　　Some Text
</div>
<div class="b c d e">
　　More Text
</div>

Example repeating structure types between these two content items include: the <div> element type by itself, div.b, div.c, and div.b.c (i.e. a <div> element type with both the "b" classifier and the "c" classifier).

2.3. Identifying a Target Repeating Structure Type

In many documents, there is typically a content section that a publisher will consider to be the "primary" content. This "primary" content section may comprise anything from a single news article or story, to a "feed" or other grouping of multiple content items. There may also be a number of content sections that are secondary in nature, such as navigation menus, sidebars, footnotes, and so forth. In an embodiment, it is desirable to insert supplemental items into a group of content items in the content section that a viewer would consider to be the "primary" section. However, while it may be obvious to the viewer which section is primary, identifying this section can be a relatively difficult task for a computer, particularly when there are multiple different groups of content items that have their own respective common structure type(s). Various rules and/or machine learning algorithms may be utilized to predict the primary section of the document, based on a structure type that is repeated within that section. This structure type is described herein as the "target" repeating structure type, and it may be used both for generating the supplemental item template, and for identifying the insertion point within the document.

In an embodiment, identifying the repeating structure type is a relatively trivial task, either because the insertion process involves documents with only one repeated structure type, or because the target repeating structure type is guaranteed to always have a specific name or identifying characteristic. For example, in an embodiment, each content item in the group of content items into which a supplemental item is to be inserted is required to have a specific element name or class, such as "article," "post," "feeditem," or "entry." In an embodiment, the document publisher may simply provide a name or identifier of the repeating structure type to supplemental item insertion component. For example, the document publisher may provide the name or identifier as a parameter in an application programming interface ("API") call that initiates the insertion process. Or, the document publisher may specify a name or identifier of the target repeating structure type for a set of documents in a separate configuration process.

In an embodiment, identifying the target repeating structure type involves applying a pattern-matching algorithm to identify repeating structures. For example, one technique might involve simply performing string-based searches for repeating markup tags or attributes. Another technique might involve constructing a DOM or other document structural tree and analyzing the various nodes thereof for the types of repeating structure types described in the previous section. In an embodiment, the tree may be analyzed using a bottom-up approach. For instance, a repetition of image nodes at a certain level within the tree, or a repetition of a certain structure such as a parent node consisting of two child nodes, may suggest a pattern. The algorithm may recursively walk up the tree looking for root nodes at which this pattern begins. In an embodiment, the tree may instead be analyzed using a top-down approach.

A pattern recognition algorithm may then be applied to determine which of the identified repeating structure types is most likely the target repeating structure type, based on historical user feedback. For instance, the algorithm may have been trained based on historical data indicating that 95% of the time, when a given structure type repeats ten or more times with the same classifier, the given structure type is the target repeating structure type. Thus, the algorithm selects the given structure type.

In an embodiment, some or all identified repeating structure types identified within the document are analyzed to derive features representative of any of a variety of characteristics. Example characteristics represented by these features include, without limitation, how often a structure type is repeated, how similar the contents of each content item that conforms to the structure type are, the presence or absence of certain keywords (such as "article" or "related content") in or adjacent to content items that conform to the structure type, the types of formatting applied to the repeating structure types in a style sheet or in other formatting instructions, the types of repeated sub-structures found within content items that conform to the structure type, how well those repeated sub-structure types map to the descriptive metadata for a supplemental item, and/or where the content items that conform to the structure type appear in the document. A ranking function may be applied to each repeating structure type found in the document, with the highest-ranked repeating structure type being selected as the target repeating structure type. The weights of the ranking function may be learned from human-supervised classifications of content items in a training set of documents, and/or updated based on feedback from human-based evaluation of the results of the ranking function over time.

In an embodiment, a trained algorithm looks for patterns of repeated element types, element classes, and/or element formatting styles. Once the patterns have been discovered, the algorithm recursively traverses the DOM tree up from the elements that form the pattern, to identify any nodes that may be root nodes for the target repeating structure type. Through statistical pattern detection, the most important patterns and their corresponding root nodes are identified. The algorithm may involve, without limitation, hidden markov models, Bayesian classifiers, neural networks, and/or other suitable pattern recognition approaches.

In an embodiment, for certain "close" cases, in which the confidence of a ranking function or classifier is not above a threshold percentage, the document may be submitted to a human-supervised classification process for review, such as "Mechanical Turk" by Amazon.com, Inc. A human may designate the "most important" content items in the document, and the repeating structure type that most closely corresponds to those content items is used. The feedback may further be used to improve the ranking function or classifier.

In an embodiment, identifying the target repeating structure type involves determining whether the document is associated with a separate Rich Site Summary (RSS) feed, or other type of feed. For example, the document may reference the URL of an RSS feed in its header. The feed items within the feed are compared to the content items within the document. A group of content items that are substantially similar to the feed items is selected. For example, if the title and/or description of each feed item is the same as text found within a first portion of each content item in a group of content items, the group of content items is selected. One or more data structure types to which each item of the group of content items conforms are identified, and the target data structure may then be selected from the identified structure types based on techniques described above. In an embodiment, the RSS feed may only be consulted if the above techniques fail to identify a target repeating structure type with a threshold level of confidence. In an embodiment, the fact that a group of content items matches feed items is but one consideration in rules and/or ranking functions for selecting the target repeating structure type.

In an embodiment, target repeating structure types may be selected for objectives other than identifying the primary repeated content of interest on the page. For example, rules may be designed, or algorithms may be trained, to identify a group of content items most likely to constitute a "related items" section or a "navigation" section. Moreover, for documents in which multiple supplemental items are to be inserted, different repeating structure types may be the target of different supplemental items. For example, one supplemental item may be inserted in a group of content items most likely to constitute a slideshow, whereas another supplemental item may be inserted in the group of content items most likely to constitute a comments feed.

2.4. Generating a Supplemental Item Template

Once the target repeating structure type for a document has been identified, a supplemental item template may be generated based on an analysis of the contents of one or more content items that conform to the target repeating structure type. In an embodiment, this process comprises identifying sub-structure types found in the analyzed content item(s). The identified sub-structure types may be limited to those that are used in at least a substantial number of content items that conform to the target structure type, or the sub-structure types may simply be taken from one or more content items without consideration of how often they repeat.

Various fields of supplemental item descriptive metadata are then mapped to the most appropriate sub-structure type. This mapping may involve comparing contents associated with these sub-structures to supplemental item metadata, processing the contents using pre-defined rules, or any other suitable mapping technique. For example, certain types of sub-elements, such as the first heading element type, may automatically be assumed to be a title, whereas other types of sub-elements may be assumed to correspond to a description if they have large amounts of textual contents. In an embodiment, the mapping process involves using a topology aware classifier to search for content-containing sub-elements and identify which of those sub-elements are most likely to correspond to which supplemental item metadata fields.

Template content items that conform to the target structure type are then generated, along with template sub-elements for at least any mapped sub-structure types. The template content items are similar to the target content items, except that certain contents of the target content items that do not conform to repeated sub-structural types, which may include text, attributes, and/or entire sub-elements, have been removed. For each mapped field of supplemental item descriptive metadata, a variable or other identifier that represents the field is then inserted as a dynamic value into the template sub-element(s) to which the field is mapped.

For example, each supplemental item may have metadata for a thumbnail image, title, description, link, and sponsorship information. Meanwhile, the target repeating structure may be a <div> element type with a "post" class. A document content item that conforms to this target repeating structure type may be as shown in Table 2.

TABLE 2

EXAMPLE TARGET CONTENT ITEM

<div class="post sports sf" id="giants1">
  <h2>Giants Sweep the Series!</h2>
  <p class ="byline"><span class="date">Oct. 31,
    2012</span><span class="source">Associated
    Press</span></p>
  <a href="giantssweep.html"><img src="123.jpg" /></a>
  <p class="content">The San Francisco Giants . . . </p>
  <p class="footer">The End</p>
</div>

Various mapping rules may result in identifying the following mappings between sub-structure types found in the above content item and the supplemental item metadata fields: "h2"=title (denoted below by the variable $title), "p.byline span.source"=sponsorship information ($sponsorship), "p.content"=description ($description), "a href"=link ($link), and "img"=thumbnail image ($thumb). Accordingly, a supplemental item template may be generated as depicted in Table 3.

TABLE 3

EXAMPLE TEMPLATE

```
<div class="post">
    <h2>$title</h2>
    <p class="byline"> <span class="source">
        $sponsorship</span></p>
    <a href="$link"><img src="$thumb" /></a>
    <p class="content">$description</p>
</div>
```

Note that various sub-elements from the content item are omitted from the template. This may occur because there are no repeating sub-structure types corresponding to these sub-elements and/or because no metadata field was mapped to their respective sub-structure types. However, in other embodiments, sub-elements may still be included in the template for non-mapped sub-structure types, even if left empty.

In an embodiment, certain static content may always be added to a supplemental item template, such as text that indicates that the supplemental item is "Sponsored Content." This static content may be defined globally, configured for specific sets of URLs or providers, and/or defined dynamically by a parameter in a request to insert supplemental content.

2.5. Identifying an Insertion Point

Once a target repeating structure type has been identified, an insertion point may be identified relevant to a group of content items having the target repeating structure type using any of a variety of techniques based on publisher-enforced business rules, user profiles, content analyses, and/or other factors. For example, an item number before or after which insertion should occur may be selected at random, based on instructions associated with a URL or a particular supplemental item, based on the contents or expected contents of the document itself, based on tracking data associated with a client at which the document will be presented, based on tracking data associated with a user identifier provided by the client at which the document will be presented, and so forth.

For example, a content provider may establish a rule that, for all URLs on websites hosted by the provider, supplemental items are to be inserted immediately before the fourth content item of the target group of content items. As another example, an insertion point may be selected in front of the fourth content item because the user tracking data indicates that the user is more likely to respond to advertisements shown before the fourth content item than before other content items. As another example, an insertion point may be selected based in part on a constraint imposed by a publisher or advertiser that the supplemental item should appear no higher than within a first number of pixels or sections of the document. In an embodiment, the insertion point may be specified by data that accompanies the information in block 410. For example, a request to insert a supplemental item may include a parameter that indicates the numbered position at which to insert the supplemental item.

In an embodiment, the insertion point determined in block 430 of FIG. 4 may be designated with conditional logic. For example, an insertion rule may be to first search the document for any content items that mention keywords associated with a particular supplemental item. If more than one matching content items are found, the matching content items may be ranked using any suitable relevance function, or the first such matching content item may be selected. The supplemental item is then inserted adjacent to the matching content item, either before or after the content item. If no matching content item is found, the supplemental item may be inserted before a particular enumerated content item, or not at all, depending on rules associated with the document and/or the supplemental item. In an embodiment, such logic may require that the supplemental item be selected, per block 440, prior to determining the insertion point. Moreover, particularly in embodiments where template caching is enabled and the document may change relatively quickly, a server may need to instruct a client device to implement the conditional logic. Such embodiments may further involve the client device reporting where or even if the supplemental item was shown.

In some embodiments, a publisher may identify an insertion point directly within the document, using comments in the document markup or other suitable instructions. In an embodiment, the insertion point is always designated in this manner. In another embodiment, if a predefined insertion point within a document is found, the pre-defined insertion point simply overrides an insertion point determined using the other techniques described above. In another embodiment, a pre-defined insertion point provides a fallback insertion point, in case another insertion point cannot be automatically determined, or an automatically determined insertion point cannot be found.

In an embodiment, supplemental items may be inserted by way of replacement of an existing supplemental item, in which case identifying the insertion point may comprise identifying the location of an existing supplemental item. In some cases, the location of the existing supplemental item will be known since it may have been inserted in a previous iteration of flow 400. In other cases, an existing supplemental item may be identified by, for example, searching for certain pre-defined identifiers or classifiers, or by identifying content items that conform to the repeating structure type and comprise images or other resources originating from a pre-defined group of web servers.

2.6. Achieving Native Appearance

In contrast to certain conventional supplemental item insertion techniques, which simply utilize pre-rendered supplemental items, such as images or other resources, the supplemental items in the herein-described techniques are described by metadata that is separate from any rendering. Based on this metadata, the supplemental items may thus be rendered dynamically as they are needed, therefore allowing the supplemental items to be formatted differently depending on the document in which they are inserted.

In an embodiment, as a result of the herein-described techniques, the structure and sub-structure types used in a supplemental item template are the same as or similar to those of other content items in the group of content items into which the supplemental item is inserted. Consequently, a supplemental item rendered using the supplemental item template will typically have a more "native" appearance than supplemental items inserted using certain conventional techniques. For example, the supplemental item may inherit the same style and/or layout options, defined by a Cascading Style Sheet or other suitable formatting instructions, that are used by the content items within the document. Or, the structure and sub-structure types may be chosen in such a manner as to include formatting attributes found in common amongst the content items.

In other embodiments, the techniques described herein may not necessary result in a supplemental item of substantially "native" appearance, but nonetheless may provide other advantages, such as improved flexibility or efficiencies.

3.0. Structural Overview

3.1. General System

Figure 5:
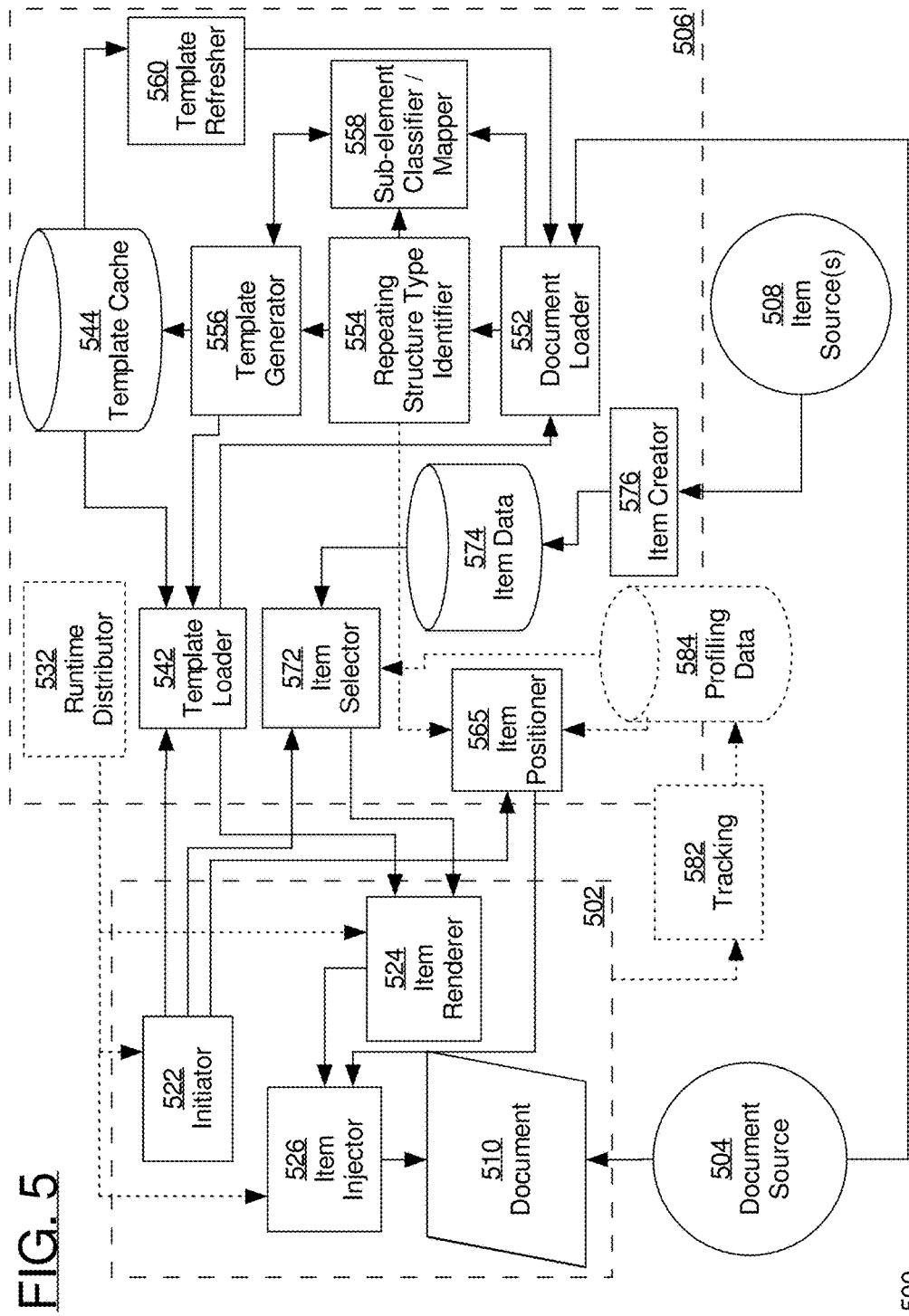
FIG. 5 illustrates an example system for inserting supplemental items in a document.

FIG. 5 illustrates an example system 500 for inserting supplemental items in a document 510, according to an embodiment. System 500 comprises components 522-584. Components 522-584 execute various logic for inserting supplemental items into document 510, and may be implemented by any suitable combination of computer software and/or hardware.

Initiating the Insertion Process

Initiating component 522 sends information about document 510 to one or more of a template loader component 542, an item selector component 572, and/or an item positioner component 565. Initiating component 522 may do so in response to a variety of events, such as in response to interpreting certain triggering instructions embedded in document 510, detecting that document 510 has been loaded for viewing, detecting that a certain amount of time has passed since last inserting or replacing a supplemental item in document 510, or receiving explicit user input requesting insertion of a supplemental item. Depending on the embodiment, the information about document 510 may include one or more of: a uniform resource identifier ("URI") or other suitable identifier/locator for document 510, metadata describing various aspects of document 510, excerpts from document 510, or the entire document 510. In an embodiment, the information includes a unique placement identifier for the document that does not change even if the contents and/or URL of document 510 change.

Additionally, initiating component 522 may also send one or more parameters that affect how a repeating structure type is identified, one or more parameters that affect how a template is chosen, one or more parameters that affect how a supplemental item is selected, information about a context in which document 510 is being viewed (e.g. at a mobile browser or at a certain type of device), and so forth. Initiating component 522 may provide different information to different components of template loader 542, item selector 572, and item positioner 565. Initiating component 522 may send information about document 510 to each of template loader 542, item selector 572, and item positioner 565 in separate communications at a same or different time. Alternatively, initiating component 522 may send a single communication that is relayed by an intermediary to each of template loader 542, item selector 572, and item positioner 565. Or, one or more of template loader 542, item selector 572, or item positioner 565 may relay document information from initiating component 522 to one or more other components of template loader 542, item selector 572, and item positioner 565.

Template Loading/Generation

Template loader 542 selects a supplemental item template based on the received information, using techniques such as described in other sections. Template loader 542 is communicatively coupled to a document loader 552, which loads document 510 for analysis. In embodiments where initiating component 522 sends document 510, or sufficient excerpts from document 510, to template loader 542, loading document 510 is a relatively trivial task. In embodiments where initiating component 522 only sends a URI or other identifier to template loader 542, document loader uses the provided identifier to locate and retrieve document 510 from a document source 504.

Once document loader 552 has loaded document 510, a repeating structure type identifier 554 identifies repeating structure types, using techniques such as described in other sections. Element classifier/mapper 558 analyzes content items that conform to the identified repeating structure type to determine how to map supplemental item metadata fields to the various sub-structure types utilized by those content items, again using techniques such as described in other sections. A template generator utilizes the outputs from repeating structure type identifier 554 and element classifier/mapper 558 to generate a supplemental item template, again using techniques such as described in other sections.

Template Caching

In an embodiment, template loader 542 is configured to immediately load the template generated by template generator 556. In other embodiments, system 500 optionally comprises a template cache 544. Template cache 544 comprises records that associate document information, such as a URI or other identifier, with a pre-existing supplemental item template, as generated by template generator 556. In some embodiments, template loader 542 may be configured to initiate template generation by components 552-558 when template cache 544 does not contain a supplemental item template for document 510. In an embodiment, when template cache 544 does not contain a supplemental item template for document 510, template loader 542 may wait to load a supplemental item template that is newly generated by template generator 556. In an embodiment, template loader 542 may decline to insert a supplemental item, or may return a default template that is not generated based on the contents of document 510, until template cache 544 contains a supplemental item template for document 510.

A template refresher 560 may update supplemental item templates in template cache 544 from time to time (e.g. every 15 minutes, every day, as resources allow, etc.). Template refresher 560 scans metadata associated with the supplemental item templates cached in template cache 544 to determine when to update supplemental item templates. Different templates may be updated at different frequencies, based on factors such as how often the templates are accessed or how often their associated documents change. Moreover, template refresher 560 may remove templates from cache 544 if the templates are accessed infrequently. Template refresher 560 is further coupled to document loader 552, in order to initiate supplemental item template generation. In an embodiment, template loader 542 may also or instead instruct components 552-558 to generate a new template in the background each time a supplemental item template is loaded from template cache 544.

In an embodiment, template cache 544 may further include information about each document for which a supplemental item template has been generated, and any time template loader 542 or template refresher 560 requests that a new template be generated, document loader 552 may compare document 510 to this information to determine whether a new template actually needs to be generated. This information may be an entire previous version of document 510, excerpts therefrom, or verification data such as described in other sections. For example, the comparison may reveal whether the underlying structures and/or substructures of document 510 have recently changed in such a manner as to potentially obsolete a cached supplemental item template. If so, a new template is generated. Otherwise, the template already in the cache remains valid. In an embodiment, template generation may also or instead be initiated in response to a client reporting that verification data for a document did not match the document.

Item Selection

In an embodiment, item selector 572 selects a supplemental item to insert into document 510, based on information about document 510 received from initiating component 522. For example, item selector 572 may select a supplemental item based on an analysis of content in document 510, or metadata associated with document 510. In other embodiments, however, item selection need not necessarily involve any information about document 510. Item selection may further or instead involve a variety of other information, such as the supplemental item template loaded by template loader 542 or profiling data 584 collected by a tracking component 582.

Profiling data 584 may be any suitable historical data collected, through any suitable tracking techniques, at least partially in relation to a client 502 at which document 510 is to be viewed. For example, profiling data 584 may be Hyper-text Transfer Protocol ("HTTP") session data collected in association with one or more cookies and/or unique identifiers provided by a client 502. Profiling data 584 may be specific to a certain user identifier or client device, or profiling data 584 may be generalized to a locale or a demographic to which client 502 is suspected to belong.

Supplemental items are selected from a repository of item data 574. Item data 574 may include a variety of metadata for a number of supplemental items. For each supplemental item, the metadata may include, without limitation, some or all of: a title, content, a thumbnail, a video, an image, a link address, keyword(s), a compensation amount, a number of times the item has been inserted, a click-through rate, a target number of insertions, preferred provider(s) into whose content the supplemental item is to be inserted, preferred insertion positions, and so forth. An item creator component 576 populates item data based on input from item source(s) 508. For example, item creator 576 may include a web-based user interface or an API by which advertisers may provide input to create new supplemental items for insertion in document 510 and/or other documents.

In an embodiment, item selector 572 may utilize an auction-based selection engine, by which a supplemental item is selected for document 510 using a real-time auction process. Supplemental items may be weighted prior to the auction based on document 510 using various processes, such as a request enrichment process, a content filter process, a content optimizer process, a user segmentation process, and/or a revenue optimization process. The supplemental item with the highest "bid" is then selected for insertion.

Additional examples of item selection techniques that make use of some or all of the above components are described in other sections of this disclosure.

Item Positioning

Item positioner 565 identifies an insertion position within document 510 for the selected supplemental item. In an embodiment, the insertion position may be selected based on information about document 510. For example, each URL (or a set of URLs) may be associated with a default numbered position within the target content items of document 510, as indicated by repeating structure type identifier 554. In an embodiment, selection need not be based on information about document 510 at all. The insertion position may also or instead be selected based on factors such as the content in document 510, profiling data 584, or the selected supplemental item itself. In an embodiment, an insertion position may be cached with the supplemental item template in template cache 544. In an embodiment, template cache 544 may include identifying information for the repeating structure type within document 510, based upon which item positioner 565 may select an insertion position. In other embodiments, a default item position is always selected.

Item positioner 565 generates insertion instructions for inserting the selected supplemental item in document 510. The insertion instructions may be as simple as a number and a repeating structure type identifier, or the instructions may include code that locates the insertion position and implements the actual insertion. The insertion instructions may vary based upon the complexity of the insertion position, the type of document 510, and the platform at which the insertion is to take place. In an embodiment, item positioner 565 is combined with template generator 556, and the insertion instructions are included with the supplemental item template.

Additional examples of techniques for selecting an insertion position that make use of some or all of the above components are described in other sections of this disclosure Item Rendering and Insertion Item renderer 524 receives template data from template loader 542. Item renderer 524 may also receive, in a same or separate communication, supplemental item description metadata from item selector 572. Item renderer 524 then renders the supplemental item by applying the metadata to the supplemental item template, as described in other sections. Item injector 526 then processes the insertion instructions from item positioner 565 to insert the rendered supplemental item into document 510, again as described in other sections.

Client-Server Architecture

As depicted, system 500 further comprises a client 502, document source 504, server 506, and supplemental item source(s) 508, at which the components 522-584 may reside. Document 510 is provided by the document source 504, which may be, for example, a file system, file server, web server, or any other suitable source of content, implemented by one or more computing devices. Document source 504 is often provided by a content publisher that is different from the operators or providers of client 502, server 506, and supplemental item source(s) 508. However, this need not always be the case.

Client 502 is a client computing device, or component thereof, that displays or causes display of document 510. Client 502 may be, for example, a web browser, a document-viewing software application, an operating system, a device that executes the foregoing, or any combination thereof. Client 502 is communicatively coupled to document source 504 via any suitable means. For example, client 502 may be connected to document source 504 by one or more networks, such as the Internet. Client 502 retrieves document 510 by sending a request to document source 504 that specifies an identifier, such as a URI, for document 510, or by sending an instruction to document source 504 that causes document source 504 to generate and return document 510.

Client 502 comprises initiating component 522, item renderer 524, and insertion component 526. In an embodiment, components 522-526 may be implemented based on a combination of functions, objects, and/or other software code that is embedded in document 510 and/or retrieved from a runtime distributor component 523 at server 506 in response to instructions embedded in document 510. For instance, some or all of components 522-526 may be implemented by JavaScript code downloaded from server 506 based on a "script" tag in document 510. In another embodiment, some or all of components 522-526 are implemented based on software instructions downloaded prior to client 502 receiving document 510. For example, components 522-526 may be hard-coded components in a document-viewing application such as a web browser or word processor, and/or components of a third-party plugin, extension, background process, or other application that interfaces with such a document-viewing application.

Server 506 comprises components 532-576. Server 506 is a system of one or more server computing devices, such as web servers, application servers, and/or database servers, that collectively implement components 532-576. In an embodiment, server 506 may be operated solely by a supplemental item distributor, such as an third-party advertising or marketing firm, that is separate from document source 504 or item source 508. In other embodiments, server 506 may be implemented in full or in part by server computing devices owned and operated by a content provider that also provides document source 504.

Server system 506 may optionally comprise tracking component 582 and/or profiling data 584. However, these components may instead be provided by a different server system and/or entity than depicted in FIG. 5.

Communications between server 506 and client 502 may take place using any suitable protocols and/or data structures. For example, in an embodiment, communications to server 506 may take place using HTTP requests with POST or GET data, while communications from server 506 may involve HTTP responses having JavaScript instructions and/or JavaScript Object Notation ("JSON") or eXtensible Markup Language ("XML") data.

Variations

While various components of FIG. 5 are depicted as residing at a server 506 or a client 502, other embodiments may divide components 522-584 amongst server 506 or client 502 in different manners. For example, various embodiments may involve deploying repeating structure type identifier 554, sub-element classifier/mapper 558, item positioner 565, and/or template generator 556 at client 502. As another example, item renderer 524 may instead reside at server 506. In other embodiments, components 522-584 may reside entirely at a client 502 or entirely at a server 506. Yet other embodiments for implementing the techniques described herein may comprise fewer or different components in varying arrangements. For example, a system may omit certain components, including, without limitation, tracking component 582, profiling data 584, runtime distributor 532, or item creator 576. Moreover, the distribution of work between components 522-584 may vary from embodiment to embodiment.

3.2. System with Client-Based Insertion

Figure 6:
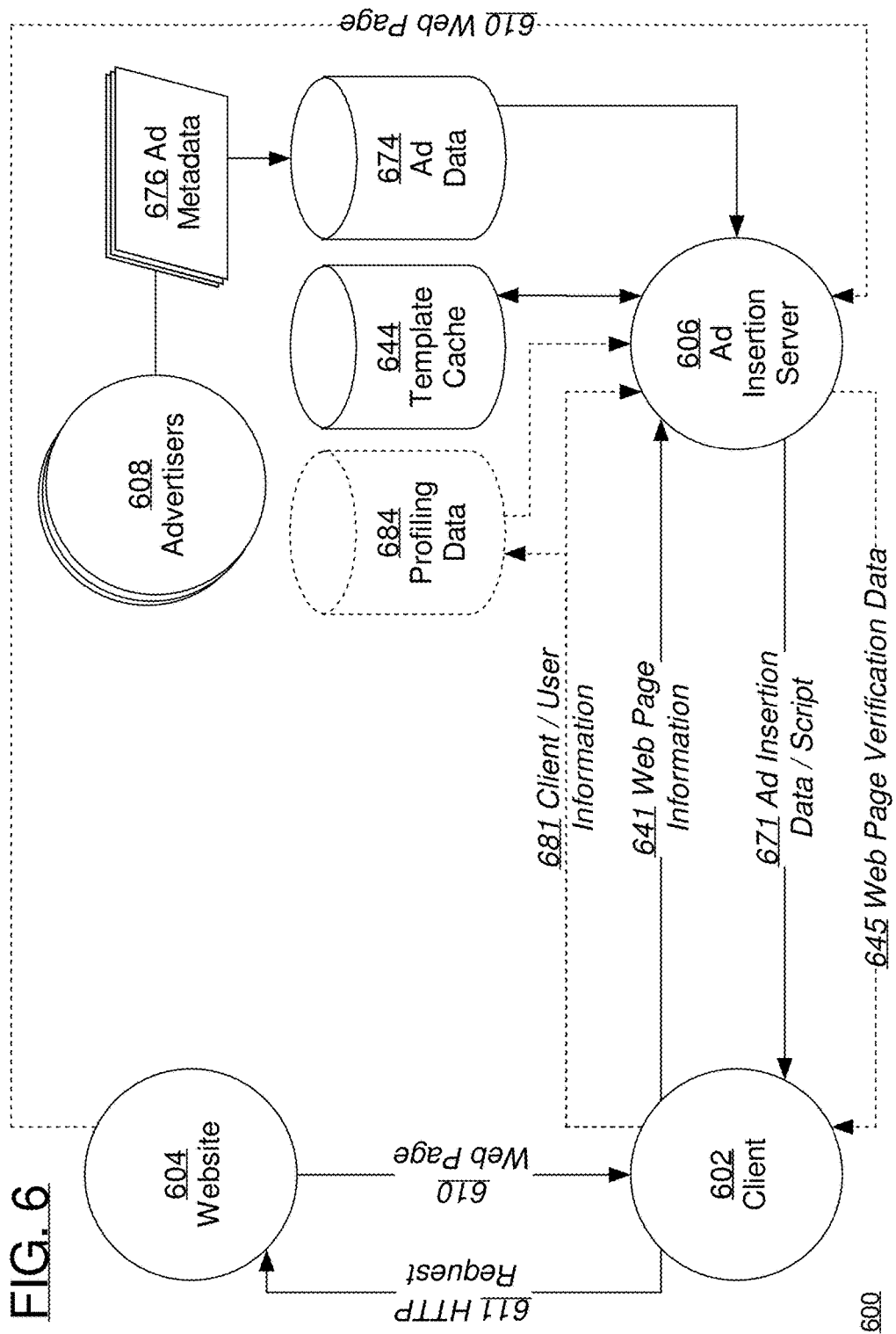
FIG. 6 is a block diagram of an example system that implements client-based insertion of supplemental items.

FIG. 6 is a block diagram of an example system 600 that implements client-based insertion of supplemental items, according to an embodiment. System 600 comprises ad data 674, which is an example of a repository of supplemental items 574. Ad data 674 is populated with ad metadata 676 from advertisers 608. A third-party ad insertion server 606 is configured to utilize the ad data 674 to dynamically insert advertisements into web pages, such as web page 610 from website 604.

System 600 further comprises a client 602 that is configured to send an HTTP request 611 to a website 604. Website 604 is configured to respond with web page 610. Client 602 is an example of a client 502 from FIG. 5. Web page 610 is an example of a document 510 from FIG. 5, and may be, for example, document 100 from FIG. 1. Website 604 is an example of a document source 504 from FIG. 5.

Client 602 comprises a web browser that interprets web page 610. Web page 610 includes content. This content includes one or more groups of markup elements that conform to a common structure type, along with one or more markup elements that do not belong to any such group. Web page 610 further includes formatting information associated with these markup elements, such as inline style attributes and/or references to external CSS information. Web page 610 optionally includes instructions to request insertion of an advertisement, such as a script tag that downloads insertion initiating instructions from ad insertion server 606. In other embodiments, client 602 may be configured to initiate the ad insertion process without explicit instructions in web page 610 (e.g. through a browser plug-in or hard-coded functionality at the client).

Once client 602 has received web page 610, client 602 is configured to send web page information 641, such as a URL or portions of the web page, to ad insertion server 606, over the course of one or more HTTP requests. Ad insertion server 606 is an example of a server 506 from FIG. 5. Ad insertion server 606 is configured to utilize ad data 674, along with components and processes such as described elsewhere in this disclosure, to generate ad insertion data 671. In an embodiment, the ad insertion data 671 comprise a supplemental item template, JSON-formatted ad metadata for an advertisement selected from ad data 674, and JavaScript code for inserting the rendered advertisement into web page 610. In another embodiment, the ad insertion data 671 comprises JavaScript instructions to insert an advertisement that has already been rendered at the ad insertion server. In other embodiments, ad insertion data 671 may comprise yet other combinations of data and/or instructions needed to assist client 602 in rendering and/or inserting an advertisement in web page 610. Ad insertion server 606 is configured to send the ad insertion data 671 back to client 602 over the course of one or more HTTP responses.

Client 602 is further configured to utilize the ad insertion data 671 to render the advertisement as an HTML-formatted element (if necessary), such as content item 370 from FIG. 3, and insert the element into web page 610. Client 602 is then configured to display the web page 610, with the inserted advertisement, to a viewer. In an embodiment, the rendered advertisement uses the same data structure type(s) as used by a group of markup elements into which the rendered advertisement was inserted, and thus the formatting instructions that were included or referenced by web page 610 apply to the rendered advertisement as well.

Ad insertion server 606 may, in some embodiments, be communicatively coupled to website 604 so that ad insertion server 606 may separately load web page 610 as needed. Ad insertion server 606 may also utilize a template cache 644 so that ad insertion server 606 is not required to generate some or all of ad insertion data 671 each time the URL of web page 610 is visited. Moreover, client 602 may further be configured to send client/user tracking information 681 to ad insertion server 606. Ad insertion server 606 generates profiling data 684, which is an example of profiling data 584 from FIG. 5, based on client/user information 681. Ad insertion server 606 may further utilize profiling data 584 when generating ad insertion data 671.

In an embodiment, some or all of the same ad insertion data 671 may be utilized for multiple visits to web page 610, even if web page 610 changes, so long as the underlying data structure types within web page 610 remain the same. Because some or all of ad insertion data 671 may be reused, ad insertion server 606 may further be configured, in some embodiments, to send web page verification data 645 to client 602. Client 602 is configured to use the web page verification data 645 to determine whether the web page 610 has recently changed in such a manner that the ad insertion data 671 cannot be used. If so, client 602 may be configured to decline to insert the advertisement, and may further be configured to report the problem to ad insertion server 606.

System 600 is but one example of a system that implements client-based insertion of supplemental items. Other systems may comprise fewer or additional components in varying arrangements.

3.3. System with Server-Based Insertion

Figure 7:
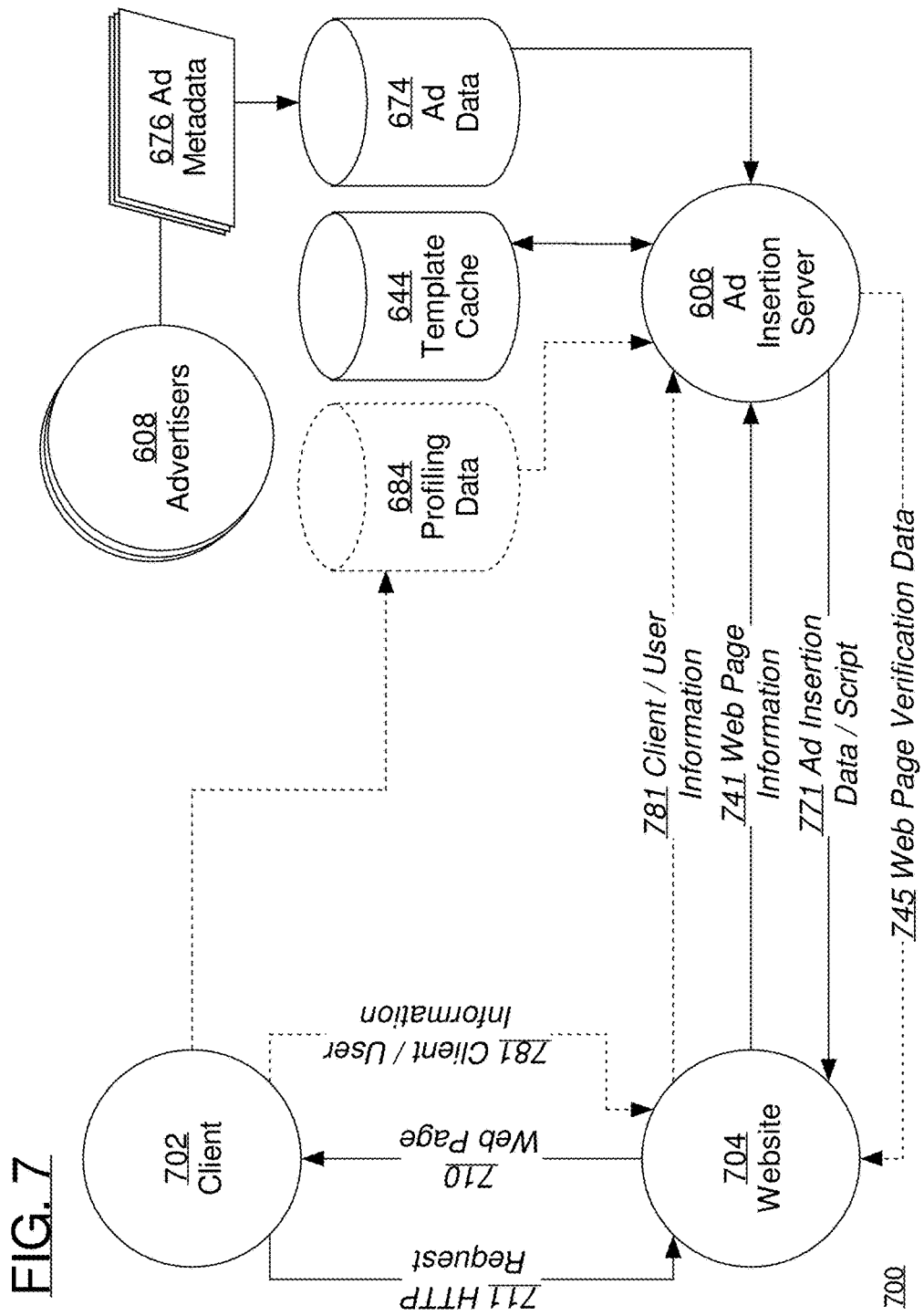
FIG. 7 is a block diagram of an example system that implements server-based insertion of supplemental items.

FIG. 7 is a block diagram of an example system 700 that implements server-based insertion of supplemental items, according to an embodiment.

Like system 700, system 600 includes ad insertion server 606, advertisers 608, ad metadata 676, and ad data 674. System 700 may likewise optionally include profiling data 684 and template cache 644. However, system 700 is configured to insert an advertisement in a web page 710. Unlike web page 610, web page 710 need not include instructions for client 702 to initiate the insertion process. Nor does client 702, which displays web page 710, need to execute instructions for inserting the advertisement or rendering the advertisement.

Instead, when client 702 sends HTTP request 711 to website 704, website 704 is configured to initiate an advertisement insertion process. For example, web page 710 may be the output of a web application, written in a language such as PHP or Java. Certain instructions within the web application may initiate the insertion process by referencing a supplemental item insertion library. As another example, website 704 may include a module that post-processes web pages before they are returned to client 702. Part of the post-processing may involve initiating the insertion process.

Website 704 is then configured to send web page information 741, which may be similar to web page information 641, to ad insertion server 606. Ad insertion server 606 is configured to generate ad insertion data 771. In an embodiment, ad insertion data 771 is similar to ad insertion data 671. In another embodiment, ad insertion data 771 may be a full web page 710, with a rendered advertisement inserted therein. Website 704 is then configured to render an advertisement (if necessary) based on ad insertion data 771, and insert the rendered advertisement in web page 710 (if necessary). Website 704 then provides the web page 710, including the inserted advertisement, to client 702.

Client 702 and/or website 704 are optionally configured to send client/user tracking information to ad insertion server 606. Moreover, ad insertion server 606 may provide web page verification data 745, which is similar to web page verification data 645, to website 704.

System 700 is but one example of a system that implements server-based insertion of supplemental items. Other systems may comprise fewer or additional components in varying arrangements. Moreover, system 600 and system 700 may in fact be part of the same system, with ad insertion server 606 being configured to facilitate both insertion techniques.

Note that, although separate embodiments are discussed herein, any combination of embodiments and/or partial embodiments discussed herein may be combined to form further embodiments.

4.0. Implementation Examples

4.1. Template Verification Data

As explained in other sections, in an embodiment, the same supplemental item template and/or insertion instructions may be utilized for multiple viewings of a document, even if the document changes between viewings, so long as the underlying data structure types within the document remain the same. Since a cached supplemental item template and/or insertion instructions may be selected for use with a document without the server having ever analyzed the current state of the document, it is thus possible that the document may have changed since the supplemental item template was cached, in such a manner as to no longer be compatible with the supplemental item template and/or insertion instructions. For example, if the document had recently changed to incorporate a new layout or new inline styles, the insertion instructions may not correctly identify the repeating structure type, and thus inadvertently insert the supplemental item in an undesirable location. Or, the supplemental item template may rely on sub-structure types which are inconsistent with those of the group of content items into which the supplemental item is to be inserted, and thus be formatted in undesirable manners.

In an embodiment, prior to an item injector 526 or other like component inserting an item into a document, a document verification component compares certain verification data to the document, in its current state. The verification data may be provided, for example, in association with the supplemental item template. In an embodiment, the verification data may be cached with the supplemental item template, and returned with or even in the supplemental item template. The verification data indicates at least the target structure type, the sub-structure types that are expected of that target structure type. The verification data may further include information that indicates the types of structures and/or formatting expected at the target insertion point. The verification data may also include further information to verify, as needed. If the verification data matches the current document, a supplemental item may be inserted. Otherwise, the supplemental item can be discarded.

4.2. Example Supplemental Item Description

In an embodiment, a supplemental item insertion server provides supplemental item descriptive metadata to a client device in an interchange format such as JSON that is parseable by the client device. An example of a supplemental item in such a format is illustrated in Table 4.

TABLE 4

EXAMPLE JSON METADATA

```
{
    "title" : "Title of Supplemntal Item"
    "description" : "Description of Supplemental Item"
    "thumb" : "http://example.com/somepic.jpg"
    "link" : "http://example.com/moreinfo.html"
    "sponsorship" : "Sponsored by YOURCOMPANY"
}
```

4.3. Example Rendered Supplemental Item

The supplemental item depicted in Table 4 may be used, for example, with the template depicted in Table 3 to render the HTML-formatted supplemental item in Table 5.

TABLE 5

EXAMPLE RENDERING OF SUPPLEMENTAL ITEM

```
<div class="post">
    <h2> Title of Supplemntal Item</h2>
    <p class="byline"> <span class="source">Sponsored by
        YOURCOMPANY</span></p>
    <a href="http://example.com/moreinfo.html"><img src="
        http://example.com/somepic.jpg" /></a>
    <p class="content"> Description of Supplemental Item</p>
</div>
```

4.4. Example Javascript-Based Insertion Flow

Figure 8:
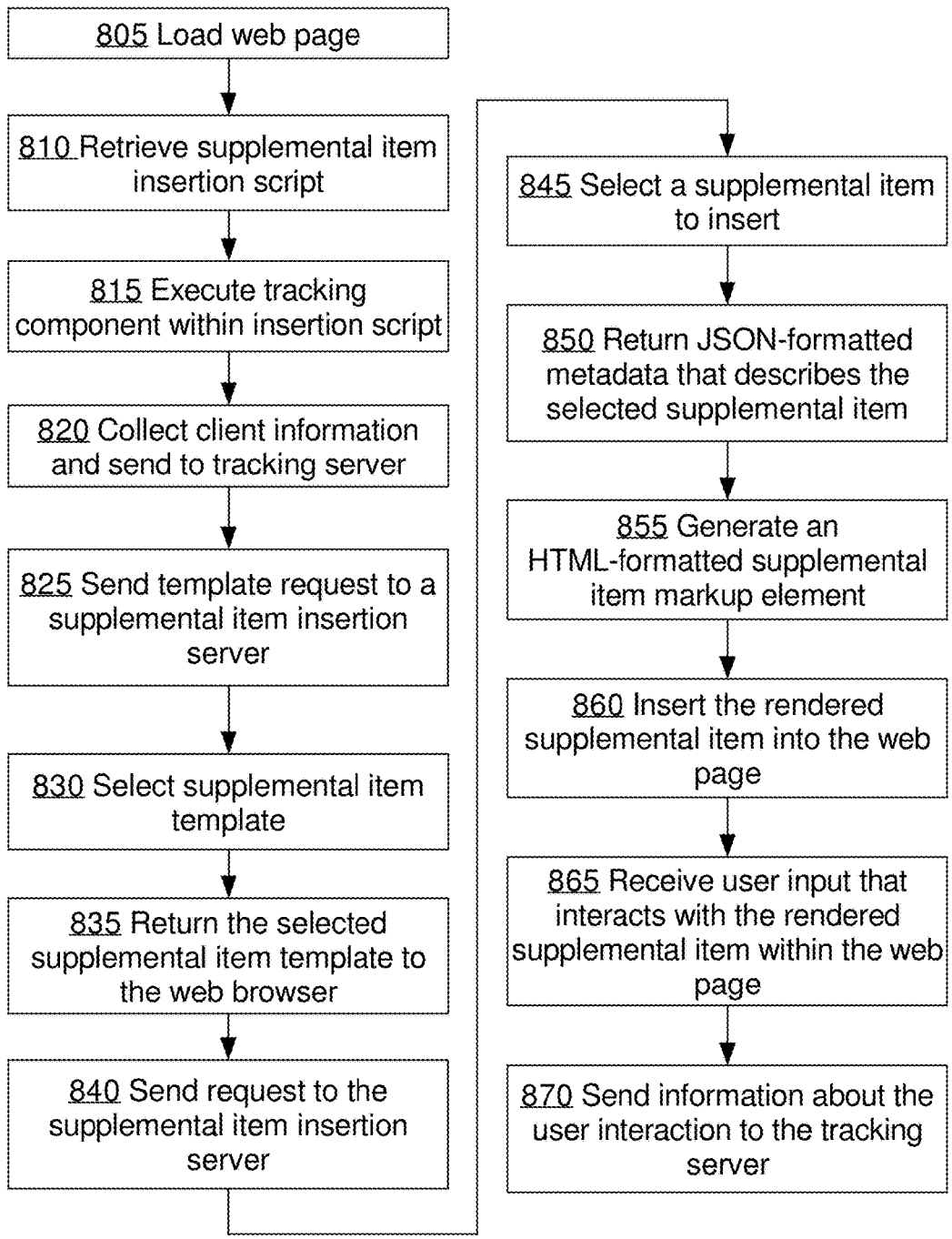
FIG. 8 illustrates an example flow for a JavaScript-based insertion of a supplemental item into a web page.

FIG. 8 illustrates an example flow 800 for a JavaScript-based insertion of a supplemental item into a web page, according to an embodiment. Flow 800 may be implemented by many of the client-based insertion systems described herein.

Block 805 comprises loading, at a web browser on a client such as client 502, a web page, which is an example of document 510. Block 810 comprises retrieving a supplemental item insertion script referenced in a "script" tag of the webpage. Block 815 comprises the web browser executing a tracking component within the insertion script. Block 820 comprises the tracking component collecting various client and/or user information and sending that information to a tracking server.

Block 825 comprises the web browser executing a template retrieval component within the insertion script to send an "Asynchronous JavaScript and XML" ("AJAX") request to a supplemental item insertion server, such as server 506. Block 830 comprises, in response to the request, a template loading component at the supplemental item insertion server, such as template loader 542, selecting a supplemental item template using techniques such as described herein. Block 835 comprises the server returning the selected supplemental item template to the web browser in any suitable template format.

Block 840 comprises the web browser executing a supplemental item requestor component within the insertion script to send a request to the supplemental item insertion server. Block 845 comprises, in response to the request, a supplemental item selector at the supplemental item insertion server, such as item selector 572, selecting a supplemental item to insert based on techniques such as described herein. Block 850 comprises the server returning JSON-formatted metadata that describes the selected supplemental item.

Block 855 comprises the web browser executing a rendering component within the insertion script to generate an HTML-formatted supplemental item markup element based on applying the JSON-formatted metadata to the template. Block 860 comprises the web browser executing an insertion component within the insertion script to insert the rendered supplemental item into the web page, using techniques such as described herein.

Block 865 comprises the web browser receiving user input that interacts with the rendered supplemental item within the web page. For example, the user input may click on a link embedded within the rendered supplemental item. Block 870 comprises, in response to the user input, the web browser once again executing the tracking component within the insertion script to send information about the user interaction to the tracking server.

4.5. Variations

In an embodiment, items may be inserted into content displayed within an application that displays repetitively structured content items, such as in mobile application for browsing a news feed or viewing social media posts. In such embodiments, and in other embodiments using other types of documents, the template may be predefined for the content, rather than generated dynamically, and the client may be responsible for identifying the target group of content items into which the supplemental item is inserted. In another embodiment, the application may be responsible for dynamically submitting the entire document to the insertion server, so that the server may generate a template. The server may then cache the template if caching is enabled.

In an embodiment, supplemental items may be inserted into documents whose target content items are arranged in such a manner that insertion of an additional item into the document would "break" the document layout and/or otherwise affect document readability or functionality. For example, a document may provide a "gallery" view in which there are three items per row. Adding an additional item might put four items on a row, or create a new row with only one item. Various techniques may be utilized for such documents. For example, a content provider may specify that, for such documents, supplemental items should be inserted by way of substitution for an existing content item. Or, a content provider may specify that an entire row of supplemental items should be inserted.

In an embodiment, publishers can provide fallback content that is inserted if a supplemental item cannot be inserted or selected.

5.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

6.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a first request comprising document information that identifies a particular document;
analyzing markup element code within the particular document to identify different types of structures that are repeated multiple times within corresponding groups of content items within the particular document;
selecting, from the identified types of structures, a target repeated structure type, the target repeated structure type being an arrangement of one or more of: markup tags or markup attributes, the arrangement repeated multiple times within the particular document;
based on the arrangement of the one or more of the markup tags or markup attributes of the selected target repeated structure type, generating a template for use in generating new content for insertion into the particular document, the template conforming to the target repeated structure type;
causing a new content item to be generated from the template by causing descriptive metadata items that describe the new content item to be inserted into template elements to which the descriptive metadata items have been mapped, the new content item also conforming to the target repeated structure type;
causing the new content item to be inserted in the particular document at an insertion point before or after a particular content item that also conforms to the target repeated structure type;
wherein the method is performed by one or more computing devices.

2. The method of claim 1, further comprising:
selecting the new content item from a repository of content items submitted by one or more third-party entities, the repository describing each of the content items with metadata values corresponding to defined fields of metadata;
retrieving the descriptive metadata items from the repository, wherein the descriptive metadata items do not conform to the repeated structure type.

3. The method of claim 1, further comprising:
receiving the first request at a server, from a client;
selecting the target repeated structure type and generating the template at the server;
the server causing the client to generate the new content item and insert the new content item into the particular document, at least partially by sending the template and the descriptive metadata items from the server to the client.

4. The method of claim 1, further comprising:
receiving the first request at a server, from a client;
selecting the target repeated structure type and generating the template at the server;
generating, at the server, insertion instructions that instruct the client to insert the new content item at the insertion point;
the server causing the client to generate the new content item and insert the new content item into the particular document at least partially by sending the template, the descriptive metadata items, and the insertion instructions from the server to the client.

5. The method of claim 1, further comprising:
receiving the first request at a server, from a first client;
responsive to the first request, selecting the target repeated structure type and generating the template at the server;
storing the template in a cache at the server;
receiving, at the server, from a second client, a second request comprising the document information that identifies the particular document;
the server causing generation of the new content item, based on the cached template in the cache, responsive to the second request;
the server further causing the second client to insert the new content item into the particular document.

6. The method of claim 1, further comprising:
receiving the first request at a server, from a first client;
responsive to the first request, selecting the target repeated structure type and generating the template at the server;
generating, at the server, verification data that identifies the target repeated structure type;
storing the template and the verification data in a cache at the server;
receiving, at the server, from a second client, a second request comprising the document information that identifies the particular document;
the server causing generation of the new content item, based on the template in the cache, responsive to the second request;
sending the verification data from the server to the second client;
the server instructing the second client to insert the new content item into the particular document responsive to the second client verifying, based on the verification data, that the particular document still comprises a group of content items that conform to the target repeated structure type.

7. The method of claim 1, wherein the particular document is a web page, the web page including instructions that cause a client to send the first request to a server, wherein the server responds to the first request at least with ad insertion data configured to cause the client to insert the new content item into the web page.

8. The method of claim 1, wherein the insertion point is between the particular content item and a second content item that conforms to the target repeated structure type.

9. The method of claim 1, further comprising:
wherein selecting the target repeated structure type from the identified different types of structures comprises using a pattern recognition component, the pattern recognition component comprising one or more of: a hidden markov model, a Bayesian classifier, or a neural network.

10. The method of claim 1,
wherein generating the template comprises, for a group of content items that conform to
the target repeated structure type:
identifying sub-structure types to which sub-items of content items, in the group of content items, conform;
identifying which of the sub-structure types are repeated sub-structure types that are used in multiple content items within the group of content items;
mapping the repeated sub-structure types to fields of metadata within a repository of supplemental item metadata;
generating one or more template elements that correspond to the target repeated structure type;
generating, within the one or more template elements, one or more template sub-elements that correspond to the mapped repeated sub-structure types;
inserting variables representing the mapped fields of metadata into template sub-elements to which the mapped fields of metadata are mapped;
wherein causing descriptive metadata items that describe the new content item to be inserted into template elements to which the descriptive metadata items have been mapped comprises replacing the variables with the metadata items.

11. The method of claim 1, further comprising selecting the insertion point based on one or more of: client identification information associated with the first request, user identification information associated with the first request, or one or more keywords identified within the particular content item.

12. A system comprising at least one or more processors and a memory storing instructions that, when executed by the one or more processors, implement:
a distribution component, configured to distribute item insertion initiating instructions to clients at which documents will be displayed, the item insertion initiating instructions configured to cause the clients to send requests to a server to insert supplemental items into the documents;
a template cache configured to store, in one or more memories, supplemental item templates for use in generating new content for insertion into the documents;
a template loader component, at the server, configured to select particular supplemental item templates from the template cache based on document identifying information associated with the requests, different templates being selected from the template cache for different documents;
a repository of supplemental items configured to store supplemental item descriptive metadata for each of the supplemental items;
an item selector component, at the server, configured to select, from the repository of supplemental items, particular supplemental items to insert in the documents based on the requests;
one or more supplemental item renderers configured to generate rendered supplemental items from the particular supplemental item templates selected by the template loader component and the particular supplemental items selected by the item selector component, the rendered supplemental items generated by causing particular descriptive metadata items of the particular supplemental items to be inserted into template elements to which the particular descriptive metadata items have been mapped in corresponding templates of the particular supplemental item templates;
one or more item insertion components configured to insert the rendered supplemental items into the documents.

13. The system of claim 12, further comprising:
a template generation component that generates the supplemental item templates based on analyzing markup element code within the documents to identify different types of structures that are repeated multiple times within corresponding groups of content items within the documents, and selecting, from the identified types of structures, target repeated structure types for the documents, the target repeated structure type of one document differing from the target repeated structure type of another document.

14. One or more non-transitory computer-readable media storing instructions that, when executed by one or more computing devices,
cause performance of:
receiving a first request comprising document information that identifies a particular document;
analyzing markup element code within the particular document to identify different types of structures that are repeated multiple times within corresponding groups of content items within the particular document;
selecting, from the identified types of structures, a target repeated structure type, the target repeated structure type being an arrangement of one or more of: markup tags or markup attributes, the arrangement repeated multiple times in the particular document;
based on the arrangement of the one or more of the markup tags or markup attributes of the selected target repeated structure type, generating a template for use in generating new content for insertion into the particular document, the template conforming to the target repeated structure type;
causing a new content item to be generated from the template by causing descriptive metadata items that describe the new content item to be inserted into template elements to which the descriptive metadata items have been mapped, the new content item also conforming to the target repeated structure type;
causing the new content item to be inserted in the particular document at an insertion point before or after a particular content item that also conforms to the target repeated structure type.

15. The one or more non-transitory computer-readable media of claim 14, wherein the instructions, when executed by the one or more computing devices, further cause:
selecting the new content item from a repository of content items submitted by one or more third-party entities, the repository describing each of the content items with metadata values corresponding to defined fields of metadata;
retrieving the descriptive metadata items from the repository, wherein the descriptive metadata items not conform to the repeated structure type.

16. The one or more non-transitory computer-readable media of claim 14, wherein the instructions, when executed by the one or more computing devices, further cause:
receiving the first request at a server, from a client;
selecting the target repeated structure type and generating the template at the server;

the server causing the client to generate the new content item and insert the new content item into the particular document, at least partially by sending the template and the descriptive metadata items from the server to the client.

17. The one or more non-transitory computer-readable media of claim 14, wherein the instructions, when executed by the one or more computing devices, further cause:
receiving the first request at a server, from a client;
selecting the target repeated structure type and generating the template at the server;
generating, at the server, insertion instructions that instruct the client to insert the new content item at the insertion point;
the server causing the client to generate the new content item and insert the new content item into the particular document at least partially by sending the template, the descriptive metadata items, and the insertion instructions from the server to the client.

18. The one or more non-transitory computer-readable media of claim 14, wherein the instructions, when executed by the one or more computing devices, further cause:
receiving the first request at a server, from a first client;
responsive to the first request, selecting the target repeated structure type and generating the template at the server;
storing the template in a cache at the server;
receiving, at the server, from a second client, a second request comprising the document information that identifies the particular document;
the server causing generation of the new content item, based on the cached template in the cache, responsive to the second request;
the server further causing the second client to insert the new content item into the particular document.

19. The one or more non-transitory computer-readable media of claim 14, wherein the instructions, when executed by the one or more computing devices, further cause:
receiving the first request at a server, from a first client;
responsive to the first request, selecting the target repeated structure type and generating the template at the server;
generating, at the server, verification data that identifies the target repeated structure type;
storing the template and the verification data in a cache at the server;
receiving, at the server, from a second client, a second request comprising the document information that identifies the particular document;
the server causing generation of the new content item, based on the template in the cache, responsive to the second request;
sending the verification data from the server to the second client;
the server instructing the second client to insert the new content item into the particular document responsive to the second client verifying, based on the verification data, that the particular document still comprises a group of content items that conform to the target repeated structure type.

20. The one or more non-transitory computer-readable media of claim 14, wherein the particular document is a web page, the web page including instructions that cause a client to send the first request to a server, wherein the server responds to the first request at least with ad insertion data configured to cause the client to insert the new content item into the web page.

21. The one or more non-transitory computer-readable media of claim 14, wherein the insertion point is between the particular content item and a second content item that conforms to the target repeated structure type.

22. The one or more non-transitory computer-readable media of claim 14, wherein the instructions, when executed by the one or more computing devices, further cause:
wherein selecting the target repeated structure type from the identified different types of structures comprises using a pattern recognition component, the pattern recognition component comprising one or more of: a hidden markov model, a Bayesian classifier, or a neural network.

23. The one or more non-transitory computer-readable media of claim 14,
wherein generating the template comprises, for a group of content items that conform to
the target repeated structure type:
identifying sub-structure types to which sub-items of content items, in the group of content items, conform;
identifying which of the sub-structure types are repeated sub-structure types that are used in multiple content items within the group of content items;
mapping the repeated sub-structure types to fields of metadata within a repository of supplemental item metadata;
generating one or more template elements that correspond to the target repeated structure type;
generating, within the one or more template elements, one or more template sub-elements that correspond to the mapped repeated sub-structure types;
inserting variables representing the mapped fields of metadata into template sub-elements to which the mapped fields of metadata are mapped;
wherein causing descriptive metadata items that describe the new content item to be inserted into template elements to which the descriptive metadata items have been mapped comprises replacing the variables with the metadata items.

24. The one or more non-transitory computer-readable media of claim 14, wherein the instructions, when executed by the one or more computing devices, further cause selecting the insertion point based on one or more of: client identification information associated with the first request, user identification information associated with the first request, or one or more keywords identified within the particular content item.

25. The method of claim 1,
wherein the method is performed by a first web server;
wherein the particular document is an HyperText Markup Language ("HTML") document that was downloaded from a second web server, other than the first web server, by a web browser at a client device;
wherein the template includes one or more HTML elements, classes, or styles found in the target repeated structure type;
wherein the new content item is an HTML snippet that embeds at least some of the descriptive metadata items in the one or more HTML elements, classes, or styles from the template;
wherein the insertion point is adjacent to a particular HTML element, within the document, that includes the one or more HTML elements, classes, or styles from the template;
wherein causing the new content item to be inserted in the particular document comprises sending instructions to the web browser to insert the HTML snippet in the particular document at the insertion point.

26. The system of claim 12,
wherein at least the distribution component, template loader component, and item selector components are implemented by a first web server;
wherein the documents include HyperText Markup Language ("HTML") documents that were downloaded from web servers, other than the first web server, by web browsers at client devices;
wherein each of the supplemental item templates include one or more HTML elements, classes, or styles;
wherein the rendered supplemental items are HTML snippets, each HTML snippet embedding at least some of the supplemental item descriptive metadata for a corresponding supplemental item in the one or more HTML elements, classes, or styles of a corresponding selected supplemental item template;
wherein one or more item insertion components are configured to insert each item of the rendered supplemental items adjacent to a particular HTML element, within a particular document for which the item was generated, that includes the one or more HTML elements, classes, or styles of a corresponding selected supplemental item template;
wherein the one or more item insertion components are configured to insert the rendered supplemental items, at least in part, by sending instructions to the web browsers.

27. The method of claim 1, wherein selecting the target repeated structure type from the identified types of structures comprises:
deriving features representative of characteristics of the identified types of structures;
ranking the identified types of structures using a ranking function; and
selecting a highest-ranked type of structure as the target repeated structure type.

28. The one or more non-transitory computer-readable media of claim 14, wherein selecting the target repeated structure type from the identified types of structures comprises:
deriving features representative of characteristics of the identified types of structures;
ranking the identified types of structures using a ranking function; and
selecting a highest-ranked type of structure as the target repeated structure type.

29. The method of claim 1, wherein the arrangement includes at least one combination of a specific tag with a specific class attribute.

30. The one or more non-transitory computer-readable media of claim 14, wherein the arrangement includes at least one combination of a specific tag with a specific class attribute.

* * * * *

UNITED STATES PATENT AND TRADEMARK OFFICE
CERTIFICATE OF CORRECTION

| | | |
|---|---|---|
| PATENT NO. | : 10,380,239 B2 | Page 1 of 1 |
| APPLICATION NO. | : 14/095163 | |
| DATED | : August 13, 2019 | |
| INVENTOR(S) | : Weald et al. | |

It is certified that error appears in the above-identified patent and that said Letters Patent is hereby corrected as shown below:

In the Claims

Column 33
Claim 16: Line 4: Delete "items" and insert --item--

Signed and Sealed this
Tenth Day of September, 2019

Andrei Iancu
*Director of the United States Patent and Trademark Office*